:::

(12) United States Patent
Yamanaka et al.

(10) Patent No.: US 9,229,025 B2
(45) Date of Patent: Jan. 5, 2016

(54) INERTIAL SENSOR

(75) Inventors: Kiyoko Yamanaka, Tachikawa (JP); Heewon Jeong, Tokyo (JP); Toshiaki Nakamura, Hitachinaka (JP); Masahide Hayashi, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 293 days.

(21) Appl. No.: 13/811,950

(22) PCT Filed: Aug. 8, 2011

(86) PCT No.: PCT/JP2011/068090
§ 371 (c)(1),
(2), (4) Date: Jan. 24, 2013

(87) PCT Pub. No.: WO2012/020739
PCT Pub. Date: Feb. 16, 2012

(65) Prior Publication Data
US 2013/0133422 A1 May 30, 2013

(30) Foreign Application Priority Data
Aug. 11, 2010  (JP) ................ 2010-180411

(51) Int. Cl.
*G01P 5/08* (2006.01)
*G01P 3/44* (2006.01)
(Continued)

(52) U.S. Cl.
CPC .......... *G01P 15/125* (2013.01); *G01C 19/5747* (2013.01); *G01P 15/0802* (2013.01); *G01P 21/00* (2013.01); *G01P 2015/0814* (2013.01)

(58) Field of Classification Search
CPC ..................................... G01C 23/00

USPC ............................... 73/504.03, 510
See application file for complete search history.

(56) References Cited

U.S. PATENT DOCUMENTS 6,450,029 B1   9/2002 Sakai et al.
6,584,841 B1 * 7/2003 Ichinose et al. ............ 73/504.12
(Continued)

FOREIGN PATENT DOCUMENTS

JP          5-281256 A    10/1993
JP          7-225244 A    8/1995
(Continued)

OTHER PUBLICATIONS

International Search Report with English translation dated Nov. 8, 2011 (two (2) pages).

*Primary Examiner* — Eric S McCall
*Assistant Examiner* — Anthony W Megna Fuentes
(74) *Attorney, Agent, or Firm* — Crowell & Moring LLP

(57) ABSTRACT

In order to provide an inertial sensor capable of suppressing a wrong diagnosis even in an adverse environment such that sudden noise occurs, an inertial sensor is provided with a movable part (105), a first detection unit (C1, C2) for detecting the amount of displacement of the movable part (105), a forced vibration means (503, C3, C4) for forcedly vibrating the movable part (105) by applying a diagnosis signal, a physical quantity calculation unit (502) for calculating the physical quantity from a detection signal from the first detection unit (C1, C2), and an abnormality determination unit (504) for determining the presence or absence of the abnormality for the physical quantity using the diagnosis signal obtained via the first detection unit (C1, C2), and is used within a vehicle, the inertial sensor further comprising a second sensor (510) mounted in the same vehicle and connected to the abnormality determination unit (504).

14 Claims, 14 Drawing Sheets

(51) Int. Cl.
*G01P 15/125* (2006.01)
*G01C 19/5747* (2012.01)
*G01P 21/00* (2006.01)
*G01P 15/08* (2006.01)

(56) References Cited

U.S. PATENT DOCUMENTS 7,031,852 B2 * 4/2006 Kato ............................ 702/56
7,134,336 B2 * 11/2006 Mase et al. ................. 73/504.12
7,746,091 B2 * 6/2010 Uemura ..................... 324/750.3
2006/0000280 A1 * 1/2006 Higuchi ...................... 73/504.12
2009/0017579 A1 * 1/2009 Jeong et al. .................... 438/106
2011/0100126 A1 * 5/2011 Jeong et al. ................. 73/514.32

FOREIGN PATENT DOCUMENTS

| JP | 2001-91535 A | 4/2001 |
| JP | 2008-107108 A | 5/2008 |

* cited by examiner

INERTIAL SENSOR

TECHNICAL FIELD

The present invention relates to a semiconductor physical quantity sensor produced utilizing micro-electromechanical systems (MEMS) technique, especially relates to an inertial sensor used for detecting the variation of capacitance (hereinafter called an MEMS inertial sensor or merely called an inertial sensor).

BACKGROUND ART

An acceleration sensor which is one of MEMS inertial sensors generally utilized widely is roughly configured by a weight (a movable part) and a supporting beam (an elastically deformed part) and acceleration that acts on the weight is converted to an electric signal. Such MEMS inertial sensors include a capacitance type acceleration sensor that detects the displacement of the weight which is operated when acceleration acts on the weight as the variation of the capacity of a capacitor electrode (a detection electrode) configured by the weight and a fixed part, converts the variation of the capacity to an electric signal in an LSI circuit and outputs the electric signal as the output of the MEMS inertial sensor.

Opportunities that circumferential environment is recorded and the kinetic attitude of a person and a robot, a running condition of a vehicle and others are detected by combining an inertial sensor represented by an acceleration sensor with plural types of sensors increase according to the recent popularization of sensors and the divergence of product types. Besides, opportunities that sensors are utilized on inadequate conditions related to temperature, vibrational noise, electromagnetic noise and others which cannot be respectively supposed heretofore also increase according to the divergence of scenes that sensors are utilized.

For example, in an attitude control system that supports safe running by inhibiting a side skid and spin of a vehicle, MEMS inertial sensors such as an angular velocity sensor that detects angular velocity and an acceleration sensor that detects acceleration in a longitudinal direction and in a lateral direction are used as a key device. In the attitude control system, the side skid and the spin of the vehicle are inhibited by controlling the output of an engine and a braking system based upon outputs from the angular velocity sensor and the acceleration sensor.

Failure of the inertial sensor which is the key device of the attitude control system may cause a deadly accident in the running of an automobile with high probability and the possibility of the failure of the sensor is required to be inhibited as low as possible. At the same time, if failure should occur, the failure of the sensor is promptly detected and is required to be informed a high-order system such as a control system. Besides, in a mobile robot used in a field such as care and medical care, an MEMS inertial sensor is utilized as an internal sensor for recognizing a self-condition for attitude control and touch judgment. To safely and precisely touch a person, the possibility of failure of the inertial sensor which is a key device is required to be inhibited as low as possible. At the same time, if failure should occur, the failure of the sensor is promptly detected and is required to be informed a high-order system such as a control system.

Therefore, as the possibility of the failure of the inertial sensor that records circumferential environment and detects the kinetic attitude of a person and a robot, a running condition of a vehicle and others is required to be inhibited as low as possible, it is desirable that a failure diagnostic function that promptly detects the failure of the sensor if the failure should occur is provided and a result of failure determination is reliable.

For an example of the MEMS inertial sensor provided with the failure diagnostic function, a patent literature 1 can be given. In an MEMS inertial sensor described in the patent literature 1, capacitance between a movable electrode and a fixed electrode is varied by superimposing a low-frequency diagnostic signal on an ac signal applied to detect capacitance of a detection electrode. It is described that it can be also judged whether an acceleration sensor fails or not, detecting acceleration which is a detected signal by observing whether the output generated as a result of the acceleration sensor shows oscillation or not. It is described that at this time, as the low-frequency diagnostic signal oscillates the output at an amplitude to an extent that the measurement of acceleration is not hindered, constant diagnosis that it is diagnosed whether failure occurs or not, detecting acceleration is enabled. Besides, it is described that when the diagnostic signal (the diagnosis type switching signal) is at a low level, high-acceleration diagnosis that the movable electrode is greatly oscillated forcedly is also enabled.

CITATION LIST

Patent Literature

Patent Literature 1: JP-A No. 1993-281256

SUMMARY OF INVENTION

Technical Problem

As described above, it is desirable that when the inertial sensor represented by the acceleration sensor fails, the failure can be promptly detected. Accordingly, it is desirable from a viewpoint of promptly detecting the failure that it can be diagnosed whether the failure occurs or not, operating the capacitance type sensor.

According to technique described in the patent literature 1, it can be also judged whether the acceleration sensor fails or not, detecting acceleration by superimposing the low-frequency diagnostic signal on the ac signal applied to detect the capacitance of the detection electrode.

However, when vibrational noise of a specific frequency, a specific phase and a specific dimension is made in environment in which the sensor is installed, it may be diagnosed by mistake that the acceleration sensor fails though the acceleration sensor is normal or it may be diagnosed by mistake that the acceleration sensor is normal though the acceleration sensor is abnormal. The vibrational noise of the above-mentioned specific frequency, phase and dimension means vibration having the same frequency as quantity in which the weight of the sensor is moved by the low-frequency diagnostic signal applied to detect the failure of the MEMS inertial sensor for example and having an antiphase, when such vibrational noise exists, the diagnostic signal applied to the MEMS inertial sensor is offset by the vibrational noise, and though the diagnostic signal is applied, the displacement of the weight may be different from desired quantity. That is, though the sensor is normal in the determination of failure diagnosis, it may be diagnosed by mistake that the sensor fails or though the sensor is abnormal, it may be diagnosed by mistake that the sensor is normal. When the sensor is installed, vibration-proof structure is normally provided to prevent circumferential vibration from having an effect on the output of the sensor, however, as the low-frequency signal applied to the sensor for the diagnosis of failure is relatively minor, compared with the output of the sensor, external vibration cannot fully removed with the vibration-proof structure.

FIG. 17 shows an example of a failure diagnostic signal, an upper graphic form shows a normal case, a middle graphic form shows an abnormal case, and a lower graphic form shows a case including sudden noise. A case that when the sensor is normal, a normal signal is output and when the sensor is abnormal, a signal showing abnormality is output is not wrong diagnosis. However, for example, in the case of the lower graphic form, though the sensor is normal, wrong diagnosis that the sensor is abnormal may be made.

An object of the present invention is to provide an inertial sensor that can also inhibit wrong diagnosis in such very bad environment that noise is suddenly made.

SOLUTION TO PROBLEM

In a first sensor provided with a failure diagnostic function by superimposing a low-frequency signal, contents and a method of failure diagnosis are changed according to an output value of a second sensor mounted in the same vehicle, referring to the output value of the second sensor mounted in the same vehicle.

ADVANTAGEOUS EFFECTS OF INVENTION

The inertial sensor that can also inhibit wrong diagnosis in such very bad environment that noise is suddenly made can be provided by providing the second sensor.

DESCRIPTION OF EMBODIMENTS

Figure 1:
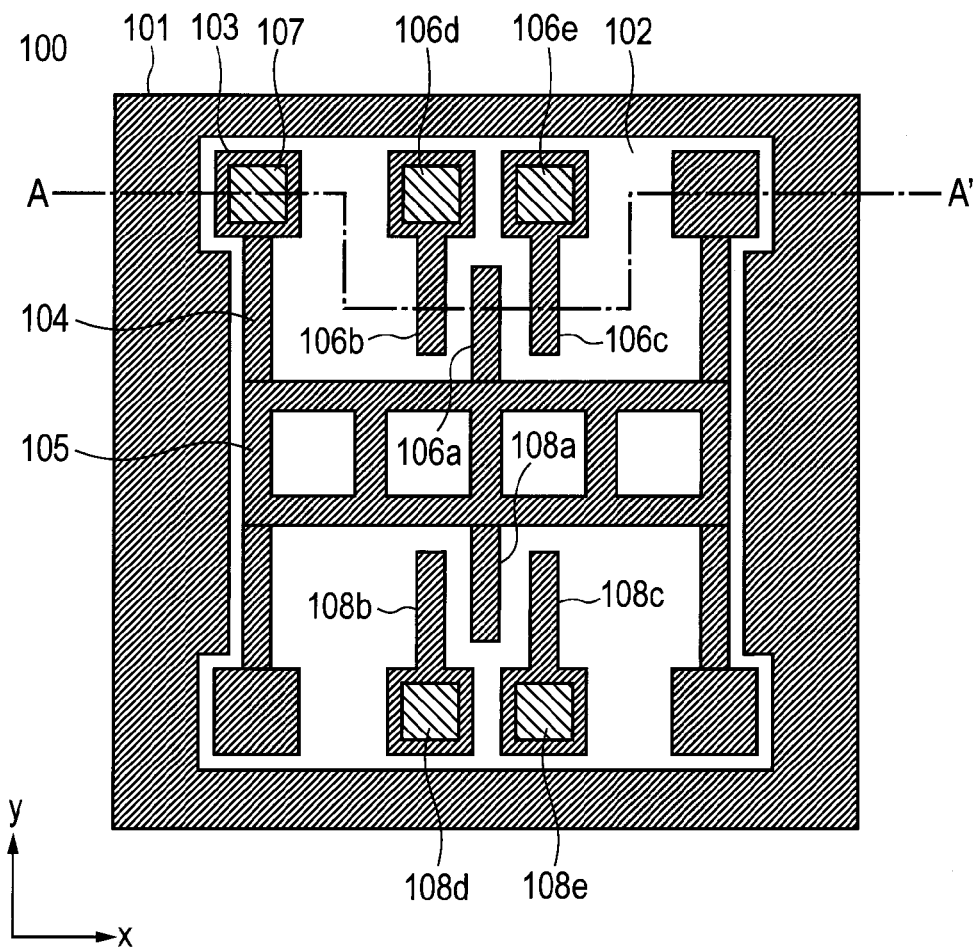
FIG. 1 is a plan showing MEMS structure that forms a first acceleration sensor in an inertial sensor equivalent to a first embodiment of the present invention.

Embodiments of the present invention will be described in detail below.

First Embodiment

Referring to the drawings, an inertial sensor equivalent to a first embodiment will be described below. In the first embodiment, an acceleration sensor as a first inertial sensor and an MEMS inertial sensor provided with an acceleration sensor as a second inertial sensor will be described for an example.

FIG. 1 is a plan showing structure that configures the first acceleration sensor formed by a semiconductor chip 100. As shown in FIG. 1, in the semiconductor chip 100, a frame 101 is formed and a cavity 102 is formed with the cavity enclosed by the frame 101. A fixed part 103 is provided to four corners inside the cavity 102 and a beam (an elastically deformed part) 104 is connected to the fixed part 103. The beam 104 is connected to a movable part 105 that functions as a weight of the acceleration sensor. That is, the fixed part 103 and the movable part 105 are connected via the elastically deformable beam 104 and the movable part 105 can be displaced in a direction shown by an arrow x in FIG. 1.

A movable electrode for detection 106a is integrated with the movable part 105, and a fixed electrode for detection 106b and a fixed electrode for detection 106c are formed opposite to the movable electrode for detection 106a. The movable electrode for detection 106a and the fixed electrode for detection 106b or the movable electrode for detection 106a and the fixed electrode for detection 106c respectively form a capacitative element and when the movable part 105 is displaced in the direction shown by the arrow x by acceleration applied from the outside, the capacity of the capacitative element varies. That is, the capacitative element configured by the movable electrode for detection 106a and the fixed electrode for detection 106b or the movable electrode for detection 106a and the fixed electrode for detection 106c functions as a capacitive detector that detects the displacement in the direction shown by the arrow x of the movable part 105 as the variation of the capacity.

Besides, a movable electrode for diagnosis 108a is integrated with the movable part 105, and a fixed electrode for diagnosis 108b and a fixed electrode for diagnosis 108c are formed opposite to the movable electrode for diagnosis 108a. The movable electrode for diagnosis 108a and the fixed electrode for diagnosis 108b or the movable electrode for diagnosis 108a and the fixed electrode for diagnosis 108c respectively form a capacitative element.

When a periodic diagnostic signal is applied between the movable electrode for diagnosis 108a and the fixed electrode for diagnosis 108b that form the capacitative element and between the movable electrode for diagnosis 108a and the fixed electrode for diagnosis 108c that form the capacitative element, electrostatic force acts between the movable electrode for diagnosis 108a and the fixed electrode for diagnosis 108b and between the movable electrode for diagnosis 108a and the fixed electrode for diagnosis 108c, and the movable electrode for diagnosis 108a is oscillated. When the movable electrode for diagnosis 108a is oscillated in the direction shown by the arrow x, the movable part 105 integrated with the movable electrode for diagnosis 108a is also oscillated. That is, the capacitative element configured by the movable electrode for diagnosis 108a and the fixed electrode for diagnosis 108b or the movable electrode for diagnosis 108a and the fixed electrode for diagnosis 108c functions as a forced oscillation generating part that forcedly oscillates the movable part 105 in the direction shown by the arrow x.

The structure of the acceleration sensor configured as described above is made of semiconductor materials such as silicon. Accordingly, the fixed part 103 and the movable part 105 mutually connected via the beam 104 are electrically connected and electric potential applied to the movable part 105 is supplied from a pad 107 formed on the fixed part 103.

In the meantime, a pad 106d and a pad 106e are also formed on the fixed electrode for detection 106b and the fixed electrode for detection 106c so that charge can flow into or out of the fixed electrode for detection 106b and the fixed electrode for detection 106c according to the variation of capacity caused when the movable part 105 is displaced in the direction shown by the arrow x.

Besides, a pad 108d and a pad 108e are also formed on the fixed electrode for diagnosis 108b and the fixed electrode for diagnosis 108c and a diagnostic signal can be applied to the fixed electrode for diagnosis 108b and the fixed electrode for diagnosis 108c from the pad 108d and the pad 108e.

Figure 2:
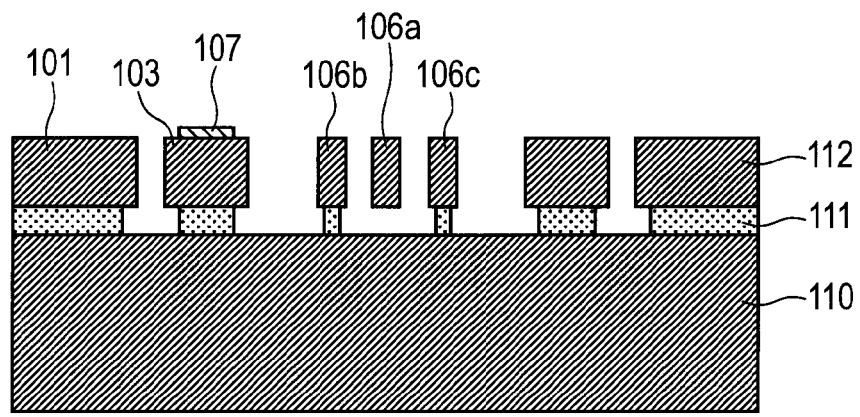
FIG. 2 is a sectional view showing the MEMS structure that forms the first acceleration sensor shown in FIG. 1 when the MEMS structure is viewed along a line A-A' in FIG. 1.

FIG. 2 is a sectional view viewed along a line A-A' shown in FIG. 1. As shown in FIG. 2, in the semiconductor chip 100, an insulating oxide film 111 is formed on a substrate 110 and a silicon active layer 112 is provided on the insulating oxide film 111. That is, in the first embodiment, the semiconductor chip 100 that configures the first acceleration sensor is configured by a silicon-on-insulator (SOI) substrate. The frame 101, the fixed part 103, the movable electrode for detection 106a integrated with the movable part 105, the fixed electrode for detection 106b and the fixed electrode for detection 106c which are respectively shown in FIG. 2 and the frame 104, the movable electrode for diagnosis 108a, the fixed electrode for diagnosis 108b and the fixed electrode for diagnosis 108c which are respectively not shown in FIG. 2 are all formed by working the silicon active layer of the SOI substrate.

For example, it is known from FIG. 2 that the frame 101 and the fixed part 103 are formed on the insulating oxide film 111 and are fixed. In the meantime, for example, the movable electrode for detection 106a integrated with the movable part 105 is also made of the silicon active layer, however, the insulating oxide film 111 formed under the movable part 105 is removed. Similarly, the insulating oxide film formed under the beam 104 not shown in FIG. 2 is also removed. Accordingly, the movable part 105 is arranged in the cavity and is supported by the beam 104. Therefore, the movable part 105 is not completely fixed to the substrate 110 and is displaceably formed.

Figure 3:
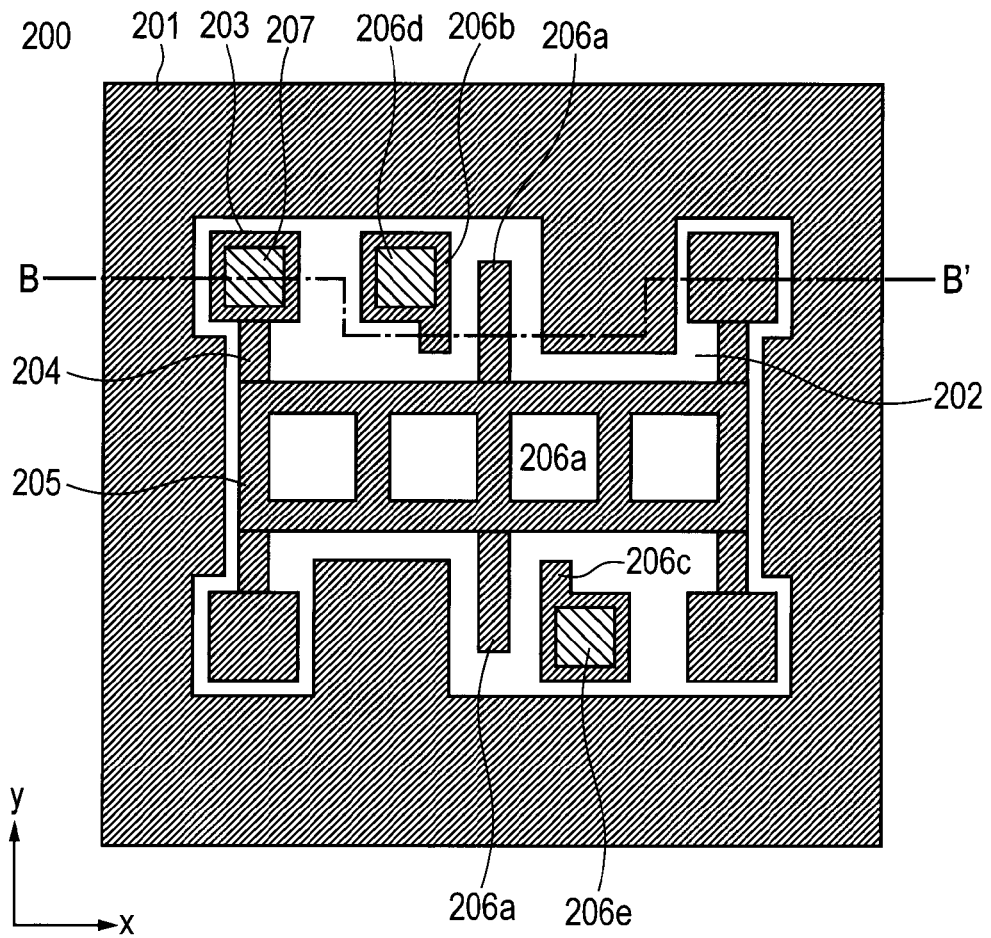
FIG. 3 is a plan showing MEMS structure that forms a second acceleration sensor in the inertial sensor equivalent to the first embodiment of the present invention.

FIG. 3 is a plan showing structure that configures a second acceleration sensor formed in a semiconductor chip 200. As shown in FIG. 3, in the semiconductor chip 200, a frame 201 is formed and a cavity 202 is formed with the cavity enclosed by the frame 201. A fixed part 203 is provided to four corners inside the cavity 202 and a beam (an elastically deformed part) 204 is connected to the fixed part 203. The beam 204 is connected to a movable part 205 that functions as a weight of the acceleration sensor. That is, the fixed part 203 and the movable part 205 are connected via the beam 204 that can be elastically deformed and the movable part 205 can be displaced in a direction shown by an arrow x in FIG. 3.

A movable electrode for detection 206a is integrated with the movable part 205, and a fixed electrode for detection 206b and a fixed electrode for detection 206c are formed opposite to the movable electrode for detection 206a. The movable electrode for detection 206a and the fixed electrode for detection 206b or the movable electrode for detection 206a and the fixed electrode for detection 206c respectively form a capacitative element and when the movable part 205 is displaced in the direction shown by the arrow x by acceleration applied from the outside, the capacity of the capacitative element varies. That is, the capacitative element configured by the movable electrode for detection 206a and the fixed electrode for detection 206b or the movable electrode for detection 206a and the fixed electrode for detection 206c functions as a capacitive detector that detects the displacement in the direction shown by the arrow x of the movable part 205 as the variation of capacity.

The structure of the acceleration sensor configured as described above is made of semiconductor materials such as silicon. Accordingly, the fixed part 203 and the movable part 205 respectively connected via the beam 204 are electrically connected and electric potential applied to the movable part 205 is supplied from a pad 207 formed on the fixed part 203. In the meantime, a pad 206d and a pad 206e are also formed on the fixed electrode for detection 206b and the fixed electrode for detection 206c so that charge can flow into or out of the fixed electrode for detection 206b and the fixed electrode for detection 206c according to the variation of capacity caused when the movable part 205 is displaced in the direction shown by the arrow x.

Figure 4:
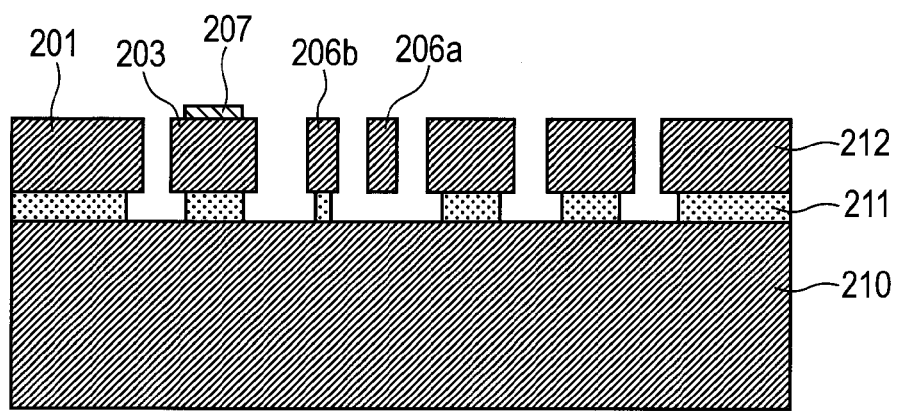
FIG. 4 is a sectional view showing the MEMS structure that forms the second acceleration sensor shown in FIG. 3 when the MEMS structure is viewed along a line B-B' in FIG. 3.

FIG. 4 is a sectional view viewed along a line B-B' in FIG. 3. As shown in FIG. 4, in the semiconductor chip 200, an insulating oxide film 211 is formed on a substrate 210 and a silicon active layer 212 is provided on the insulating oxide film 211. That is, in the first embodiment, the semiconductor chip 200 that configures the second acceleration sensor is configured by a silicon-on-insulator (SOI) substrate.

The frame 201, the fixed part 203, the movable electrode for detection 206a integrated with the movable part 205 and the fixed electrode for detection 206b which are respectively shown in FIG. 4 and the beam 204 which is not shown in FIG. 4 are formed by working the silicon active layer of the SOI substrate. Accordingly, the movable part 205 is arranged in the cavity and is supported by the beam 204. Therefore, the movable part 205 is not completely fixed to the substrate 210 and is displaceably formed.

The first and second acceleration sensors in the first embodiment are formed by working the SOI substrate by using photolithography and deep reactive iron etching (DRIE) for example. Naturally, in the first embodiment, the example that the acceleration sensor is manufactured by using the SOI substrate is described and a concept in the first embodiment can be also applied to a case (a bulk MEMS process) that an acceleration sensor (MEMS structure) is formed by working both a surface and a back side of a silicon substrate using technique for joining glass•silicon•glass and others. Further, the concept in the first embodiment can be also applied to a case (a surface MEMS process) that an acceleration sensor (MEMS structure) is formed by repeating a process that a thin film is deposited on a surface of a silicon substrate where a signal processing circuit formed by a transistor and others is formed beforehand and the deposited thin film is patterned.

The semiconductor chip 100 that configures the first acceleration sensor (the MEMS structure) and the semiconductor chip 200 that configures the second acceleration sensor (the MEMS structure) respectively in the first embodiment are configured as described above and examples of configurations in which the semiconductor chip 100 and the semiconductor chip 200 are respectively mounted will be described below. In the first embodiment, an example that the acceleration sensor (the MEMS structure) and LSI that processes an output signal from the acceleration sensor are formed in separate semiconductor chips is described, however, the present invention is not limited to this example, and the present invention can be also applied to a case that the MEMS structure that configures the acceleration sensor and a transistor that configures a signal processing circuit are formed in the same semiconductor chip. Besides, the first acceleration sensor and the second acceleration sensor may be also formed in the same semiconductor chip and further, the sensors and an element that configures a signal processing circuit that processes output signals from the sensors may be also formed in the same semiconductor chip.

Figure 5:
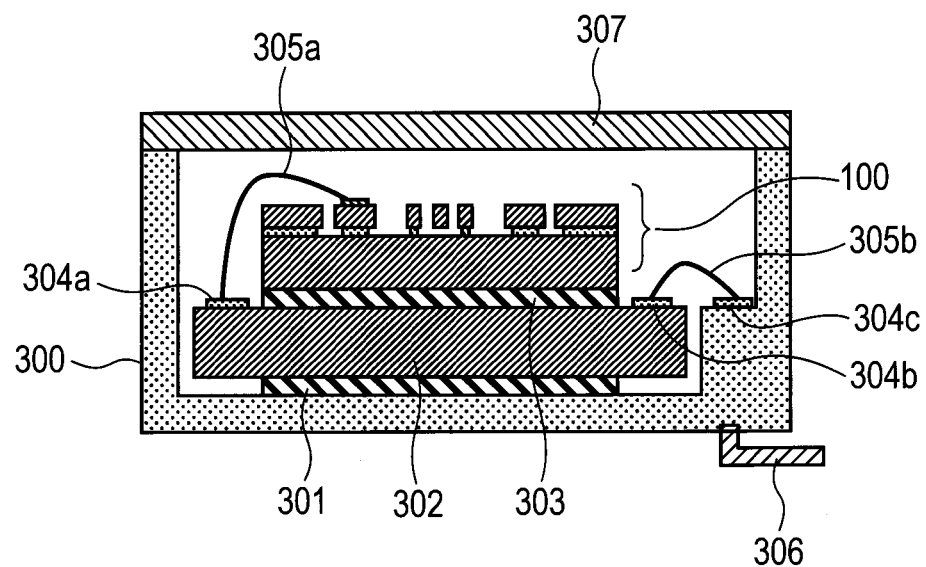
FIG. 5 is a sectional view showing structure in which the first acceleration sensor in the inertial sensor equivalent to the first embodiment of the present invention is mounted.

FIG. 5 is a sectional view showing an example of configuration in which the first acceleration sensor in the inertial sensor equivalent to the first embodiment is mounted. As shown in FIG. 5, a semiconductor chip 302 is mounted via an adhesive 301 at the bottom of an enclosure 300 provided with a concave portion. The enclosure 300 is made of a ceramic for example. In the semiconductor chip 302, an integrated circuit configured by a transistor and a passive element is formed by normal semiconductor manufacturing technique. The integrated circuit formed in the semiconductor chip 302 is provided with a function for processing an output signal from the acceleration sensor (the MEMS structure) and is a circuit that finally outputs an acceleration signal.

The semiconductor chip 100 is mounted on the upside of the semiconductor chip 302 via an adhesive 303. In the semiconductor chip 100, the MEMS structure which is shown in FIGS. 1 and 2 and which configures the first acceleration sensor is formed. The pad formed in the semiconductor chip 100 and a pad 304a formed in the semiconductor chip 302 are connected via wire 305a for example. Further, a pad 304b formed in the semiconductor chip 302 is connected to a terminal 304c formed on the enclosure 300 via wire 305b and is electrically connected to a terminal 306 connected outside the enclosure. The semiconductor chip 100 and the semiconductor chip 302 respectively laminated in the enclosure 300 are sealed by installed a lid 307 on the upside of the enclosure 300.

Figure 6:
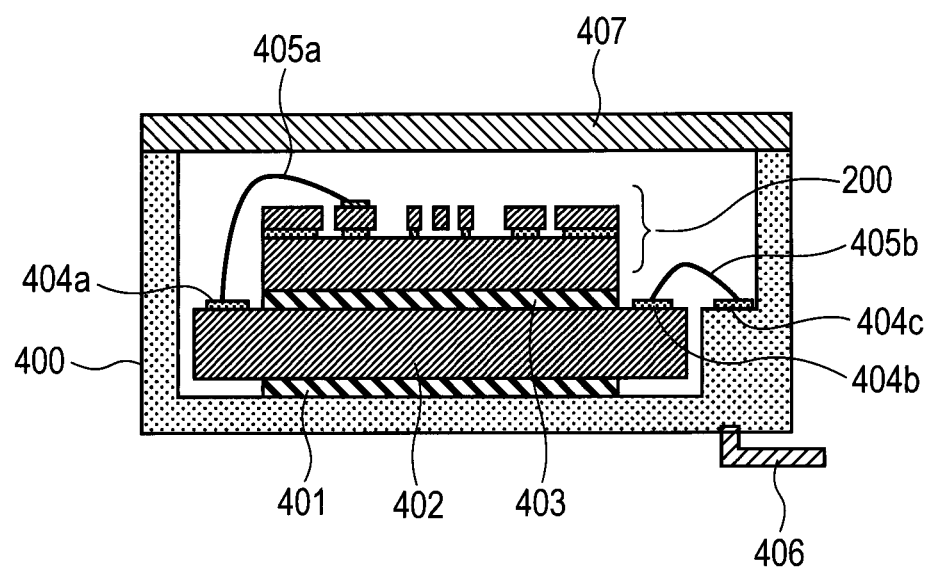
FIG. 6 is a sectional view showing structure in which the second acceleration sensor in the inertial sensor equivalent to the first embodiment of the present invention is mounted.

FIG. 6 is a sectional view showing an example of configuration in which the second acceleration sensor is mounted in the inertial sensor equivalent to the first embodiment. As shown in FIG. 6, a semiconductor chip 402 is mounted at the bottom of an enclosure 400 provided with a concave portion via an adhesive 401. The enclosure 400 is made of a ceramic for example. In the semiconductor chip 402, an integrated circuit configured by a transistor and a passive element is formed by normal semiconductor manufacturing technique. The integrated circuit formed in the semiconductor chip 402 is provided with a function for processing an output signal from the acceleration sensor (the MEMS structure) and is a circuit that finally outputs an acceleration signal.

The semiconductor chip 200 is mounted on the upside of the semiconductor chip 402 via an adhesive 403. In the semiconductor chip 200, the MEMS structure that configures the second acceleration sensor shown in FIGS. 3 and 4 is formed. The pad formed in the semiconductor chip 200 and a pad 404a formed in the semiconductor chip 402 are connected via wire 405a for example. Further, a pad 404b formed in the semiconductor chip 402 is connected to a terminal 404c formed on the enclosure 400 via wire 405b and is electrically connected to a terminal 406 connected outside the enclosure. The semiconductor chip 200 and the semiconductor chip 402 respectively laminated in the enclosure 400 are sealed by installing a lid 407 on the upside of the enclosure 400.

As described above, the first and second acceleration sensors in the first embodiment are mounted. According to the acceleration sensor shown in FIG. 5, a signal detected in the semiconductor chip 100 can be input to the semiconductor chip 302. Afterward, the signal input to the semiconductor chip 302 is processed in the integrated circuit formed in the semiconductor chip 302 and finally, an acceleration signal corresponding to acceleration is output. The acceleration signal output from the semiconductor chip 302 is output to the terminal 306 formed in the enclosure 300 via the wire 305b and can be output outside.

Besides, according to the acceleration sensor shown in FIG. 6, a signal in the semiconductor chip 200 can be input to the semiconductor chip 402. Afterward, the signal input to the semiconductor chip 402 is processed in the integrated circuit formed in the semiconductor chip 402 and finally, an acceleration signal corresponding to acceleration is output. The acceleration signal output from the semiconductor chip 402 is output to the terminal 406 formed in the enclosure 400 via the wire 405b and can be output outside.

In the first embodiment, the example that a ceramic package is used for the enclosure is described, however, the present invention is not limited to the ceramic package, and for example, the present invention can be also applied to a case in which a wafer-level package using glass anodic bonding is used.

Difference in a mechanical response to acceleration between the first acceleration sensor and the second acceleration sensor respectively formed as described above will be described below.

As shown in FIG. 1, in the first acceleration sensor in the first embodiment, the movable part 105 that can be displaced in the direction shown by the arrow x is arranged in the cavity and the is supported by the frame 101 via the beam 104. When the mass of the movable part 105 is m1 (kg) and the stiffness constant in the direction shown by the arrow x of the beam 104 is k1 (N/m), the first acceleration sensor in the first embodiment has a mechanical natural frequency fn1 (Hz) shown in an expression (1) and the displacement x1 ($m$) of the movable part when acceleration α (m/s$^2$) is applied is expressed in an expression (2).

[Mathematical expression 1]

$$fn_1 = \frac{1}{2\pi}\sqrt{\frac{k_1}{m_1}} \quad (1)$$

[Mathematical expression 2]

$$x_1 = \frac{m_1 \alpha}{k_1} = \frac{\alpha}{(2\pi f_{n1})^2} \quad (2)$$

In the meantime, as shown in FIG. 3, in the second acceleration sensor in the first embodiment, the movable part 205 that can be displaced in the direction shown by the arrow x is arranged in the cavity and is supported by the frame 201 via the beam 204. When the mass of the movable part 205 is m2 (kg) and the stiffness constant in the direction shown by the arrow x of the beam 204 is k2 (N/m), the second acceleration sensor in the first embodiment has a mechanical natural frequency fn2 (Hz) shown in an expression (3) and the displacement x2($m$) of the movable part when acceleration α (m/s²) is applied is expressed in an expression (4).

[Mathematical expression 3]

$$fn_2 = \frac{1}{2\pi}\sqrt{\frac{k_2}{m_2}} \quad (3)$$

[Mathematical expression 4]

$$x_2 = \frac{m_2 \alpha}{k_2} = \frac{\alpha}{(2\pi f_{n2})^2} \quad (4)$$

In the first embodiment, the mass m1 of the movable part 105 of the first acceleration sensor is equalized to the mass m2 of the movable part 205 of the second acceleration sensor and the stiffness constant k1 in the direction shown by the arrow x of the beam 104 of the first acceleration sensor is made smaller than the stiffness constant k2 in the direction shown by the arrow x of the beam 204 of the second acceleration sensor.

[Mathematical expression 5]

$$\frac{fn2}{fn1} = \sqrt{\frac{k_2}{k_1}} \times \sqrt{\frac{m_1}{m_2}} \quad (5)$$

In the above-mentioned case, as the mathematical expression 5 is acquired from the expressions (1), (3), fn2>fn1 and the mechanical natural frequency of the first acceleration sensor is smaller than the mechanical natural frequency of the second acceleration sensor. Therefore, when the same acceleration α (m/s²) is applied to the first acceleration sensor and the second acceleration sensor, the displacement x1 ($m$) and x2 ($m$) of the movable parts from the expressions (2), (4), (5) are as expressed in the following mathematical expression 6.

[Mathematical expression 6]

$$\frac{x1}{x2} = \left(\frac{fn2}{fn1}\right)^2 = \frac{k_2}{k_1} \times \frac{m_1}{m_2} \quad (6)$$

In this case, as fn2>fn1, the displacement x1 of the first acceleration sensor when the same acceleration α (m/s²) is applied is larger than the displacement x2 of the second acceleration sensor.

Incidentally, the movable electrode for detection 106a is integrated with the movable part 105 of the first acceleration sensor, and the fixed electrode for detection 106b and the fixed electrode for detection 106c are formed opposite to the movable electrode for detection 106a. The movable electrode for detection 106a and the fixed electrode for detection 106b or the movable electrode for detection 106a and the fixed electrode for detection 106c respectively form the capacitative element and when the movable part 105 is displaced in the direction shown by the arrow x by acceleration applied from the outside, the capacity of the capacitative element varies. That is, the capacitative element configured by the movable electrode for detection 106a and the fixed electrode for detection 106b or the movable electrode for detection 106a and the fixed electrode for detection 106c functions as a capacitive detector that detects the displacement in the direction shown by the arrow x of the movable part 105 as the variation of capacity.

As for the second acceleration sensor, the movable electrode for detection 206a is also similarly integrated the movable part 205, and the fixed electrode for detection 206b and the fixed electrode for detection 206c are formed opposite to the movable electrode for detection 206a. The capacitative element configured by the movable electrode for detection 206a and the fixed electrode for detection 206b or the movable electrode for detection 206a and the fixed electrode for detection 206c functions as a capacitive detector that detects the displacement in the direction shown by the arrow x of the movable part 205 as the variation of capacity.

Accordingly, when opposite distance between the movable electrode for detection 106a and the fixed electrode for detection 106b/106c in the first acceleration sensor is equalized to opposite distance between the movable electrode for detection 206a and the fixed electrode for detection 206b/206c in the second acceleration sensor, the displacement x1 of the first acceleration sensor when the same acceleration α (m/s²) is applied is larger than the displacement x2 of the second acceleration sensor as clear from the expression (6) and the variation of capacity in the electrode for detection of the first acceleration sensor is larger than the variation of capacity in the electrode for detection of the second acceleration sensor. That is, when the mechanical stiffness and the mass of the movable part are different between the acceleration sensors even if the same acceleration is applied, the quantity of charge that flows into or out of the electrode for detection is different.

As a range of the variation of capacity that can be handled in the semiconductor chip (the signal processing circuit) 302 shown in FIG. 5 and the semiconductor chip (the signal processing circuit) 402 shown in FIG. 6 is determined every signal processing circuit, a finally output acceleration signal includes a different value from the acceleration applied to the acceleration sensor to be false output when the quantity of charge that flows into or out of the electrode for detection exceeds the range of the variation of capacity that can be handled in the signal processing circuit. As described above, a range of acceleration that can be measured by the acceleration sensor is determined by the range of the variation of capacity that can be handled in the signal processing circuit or the mechanical natural frequency determined by the mass of the movable part of the acceleration sensor and the stiffness constant in an axial direction of detection of the beam. A range of the dimension of acceleration that can be handled without false output as a sensor system is called "a range of sensitivity" and an acceleration sensor having a range of the variation of capacity in which the sensor does not make false output even if relatively large acceleration is applied or a mechanical natural frequency is called "an acceleration sensor having a large range of sensitivity". When ranges of the variation of capacity that can be handled in the semiconductor chip (the signal processing circuit) 302 shown in FIG. 5 and the semiconductor chip (the signal processing circuit) 402 shown in FIG. 6 are set to the same, the variation of capacity in the electrode for detection of the first acceleration sensor when the same acceleration α (m/s$^2$) is applied is larger than the variation of capacity in the electrode for detection of the second acceleration sensor as clear from the expression (6) in the first embodiment and therefore, it can be said that the second acceleration sensor has a larger range of sensitivity than the first acceleration sensor.

Besides, when the mechanical natural frequency of the first acceleration sensor in the first embodiment is fn1 (Hz) and a mechanical attenuation constant is ζ1, relation among them and a mechanical cut-off frequency fc1 (Hz) is shown in an expression (7).

[Mathematical expression 7]

$$\left(\frac{fc1}{fn1}\right)^2 = -(\xi_1 - 1) + \sqrt{(\xi_1 - 1)^2 + 1} \quad (7)$$

Similarly, when the mechanical natural frequency of the second acceleration sensor in the first embodiment is fn2 (Hz) and a mechanical attenuation constant is ζ2, relation among them and a mechanical cut-off frequency fc2 (Hz) is shown in an expression (8).

[Mathematical expression 8]

$$\left(\frac{fc2}{fn2}\right)^2 = -(\xi_2 - 1) + \sqrt{(\xi_2 - 1)^2 + 1} \quad (8)$$

The attenuation constant ζ is a constant that expresses the possibility of the dissipation of energy when an object mechanically moves and is determined by a type of fluid in the environment of a circumference in which the object moves, the pressure of the fluid, the size and the structure of the moving object, substances that configure the moving object and others. As it is considered that attenuation constants ζ also have approximate values when MEMS structures having the same size and the same structure are operated under the same pressure, the following expression can be led from the expressions (5), (7), (8) if ζ1≈ζ2 in the first embodiment.

[Mathematical expression 9]

$$\left(\frac{fc1}{fc2}\right)^2 \cong \left(\frac{fn1}{fn2}\right)^2 < 1 \quad (9)$$

It is known that the mechanical cut-off frequency fc2 of the second acceleration sensor is higher than the mechanical cut-off frequency fc1 of the first acceleration sensor.

Figure 7:
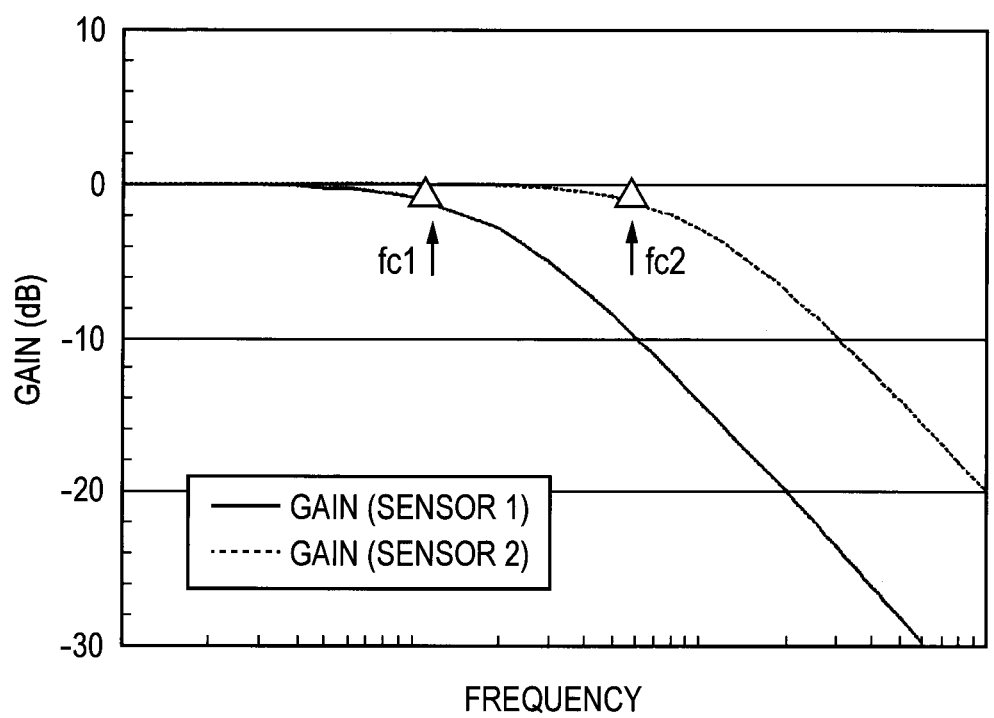
FIG. 7 shows a mechanical frequency response of the first acceleration sensor and the second acceleration sensor in the inertial sensor equivalent to the first embodiment of the present invention.

When mechanical frequency responses of the first acceleration sensor and the second acceleration sensor are shown in a graph, they are expressed as in FIG. 7 for example. This means that MEMS is mechanically operated and is displaced up to fc1 (Hz) in the first acceleration sensor when a variable frequency of acceleration applied to the sensor is gradually increased and means that the MEMS is mechanically operated and is displaced up to fc2 (Hz) in the second acceleration sensor. That is, when the variable frequency of acceleration applied to the sensor is gradually increased, the variation of capacity in the electrode for detection occurs up to fc1 (Hz) in the first acceleration sensor, however, as the sensor is not mechanically displaced for acceleration applied at fc1 (Hz) or a higher frequency, no variation of capacity occurs. Therefore, an acceleration signal finally output from the first acceleration sensor for acceleration applied at fc1 (Hz) or a higher frequency includes a different value from the applied acceleration to a false output.

Besides, when a variable frequency of acceleration applied to the sensor is gradually increased, the variation of capacity in the electrode for detection occurs up to fc2 (Hz) in the second acceleration sensor, however, as the sensor is not mechanically displaced for acceleration applied at fc2 (Hz) or a higher frequency, no variation of capacity occurs. Therefore, an acceleration signal finally output from the second acceleration sensor for acceleration applied at a fc2 (Hz) or a higher frequency includes a different value from the applied acceleration to be false output.

A scope of frequencies of acceleration that can be handled without false output as the sensor system is called "a response band" and an acceleration sensor that has a response band in which the sensor does not make false output even if acceleration having a relatively large frequency is applied is called "an acceleration sensor having a wide response band". When a scope of frequencies equivalent to the variation of capacity that can be handled in the semiconductor chip (the signal processing circuit) 302 shown in FIG. 5 and the semiconductor chip (the signal processing circuit) 402 shown in FIG. 6 is set to the same, the cut-off frequency fc2 (Hz) of the second acceleration sensor is higher than the cut-off frequency fc1 (Hz) of the first acceleration sensor as clear from the expression (8) in the first embodiment and therefore, it can be said that the second acceleration sensor has a wider response band than the first acceleration sensor.

Next, a basic operational principle of the acceleration sensor in the first embodiment will be described.

As shown in FIG. 1, the first acceleration sensor in the first embodiment is provided with the movable part 105 that can be displaced in the direction shown by the arrow x. For example, when acceleration is applied to the movable part 105 in the direction shown by the arrow x, the movable part is displaced in the direction shown by the arrow x. The movable electrode for detection 106a is integrated with the movable part 105, and the fixed electrode for detection 106b and the fixed electrode for detection 106c are formed opposite to the movable electrode for detection 106a. In this case, when the movable part 105 is displaced, the movable electrode for detection 106a is accordingly displaced. In the meantime, the fixed electrode for detection 106b and the fixed electrode for detection 106c are not displaced with them fixed. Accordingly, when acceleration is applied in the direction shown by the arrow x and the movable part 105 is displaced, distance between the electrodes of the capacitative element configured by the movable electrode for detection 106a and the fixed electrode for detection 106b or the movable electrode for detection 106a and the fixed electrode for detection 106c varies.

The variation of the distance between the electrodes of the capacitative element means that the capacitance of the capacitative element varies. As described above, when acceleration is applied in the direction shown by the arrow x, the movable part 105 is displaced in the direction shown by the arrow x and as a result, the capacitance of the capacitative element varies. The variation of capacity is converted to a voltage signal in a voltage converter and an acceleration signal is output from the acceleration sensor based upon the converted electric signal.

This tells that acceleration applied to the acceleration sensor is detected as the variation of the capacity of the capacitative element, the detected variation of the capacity is converted to a voltage signal, and finally an acceleration signal is output from the acceleration sensor.

The second sensor is also similar and as shown in FIG. 3, the second acceleration sensor in the first embodiment is provided with the movable part 205 that can be displaced in the direction shown by the arrow x. For example, when acceleration is applied to the movable part 205 in the direction shown by the arrow x, the movable part is displaced in the direction shown by the arrow x. The movable electrode for detection 206a is integrated with the movable part 205, and the fixed electrode for detection 206b and the fixed electrode for detection 206c are formed opposite to the movable electrode for detection 206a. In this case, when the movable part 205 is displaced, the movable electrode for detection 206a is accordingly displaced. In the meantime, the fixed electrode for detection 206b and the fixed electrode for detection 206c are not displaced with them fixed. Accordingly, when acceleration is applied in the direction shown by the arrow x and the movable part 205 is displaced, distance between the electrodes of the capacitative element configured by the movable electrode for detection 206a and the fixed electrode for detection 206b or the movable electrode for detection 206a and the fixed electrode for detection 206c varies.

The variation of the distance between the electrodes of the capacitative element means that the capacitance of the capacitative element varies. As described above, when acceleration is applied in the direction shown by the arrow x, the movable part 205 is displaced in the direction shown by the arrow x and as a result, the capacitance of the capacitative element varies. The variation of capacity is converted to a voltage signal in a voltage converter and an acceleration signal is output from the acceleration sensor based upon the converted electric signal. This tells that acceleration applied to the acceleration sensor is detected as the variation of the capacity of the capacitative element, the detected variation of capacity is converted to a voltage signal and finally, an acceleration signal is output from the acceleration sensor.

Figure 8:
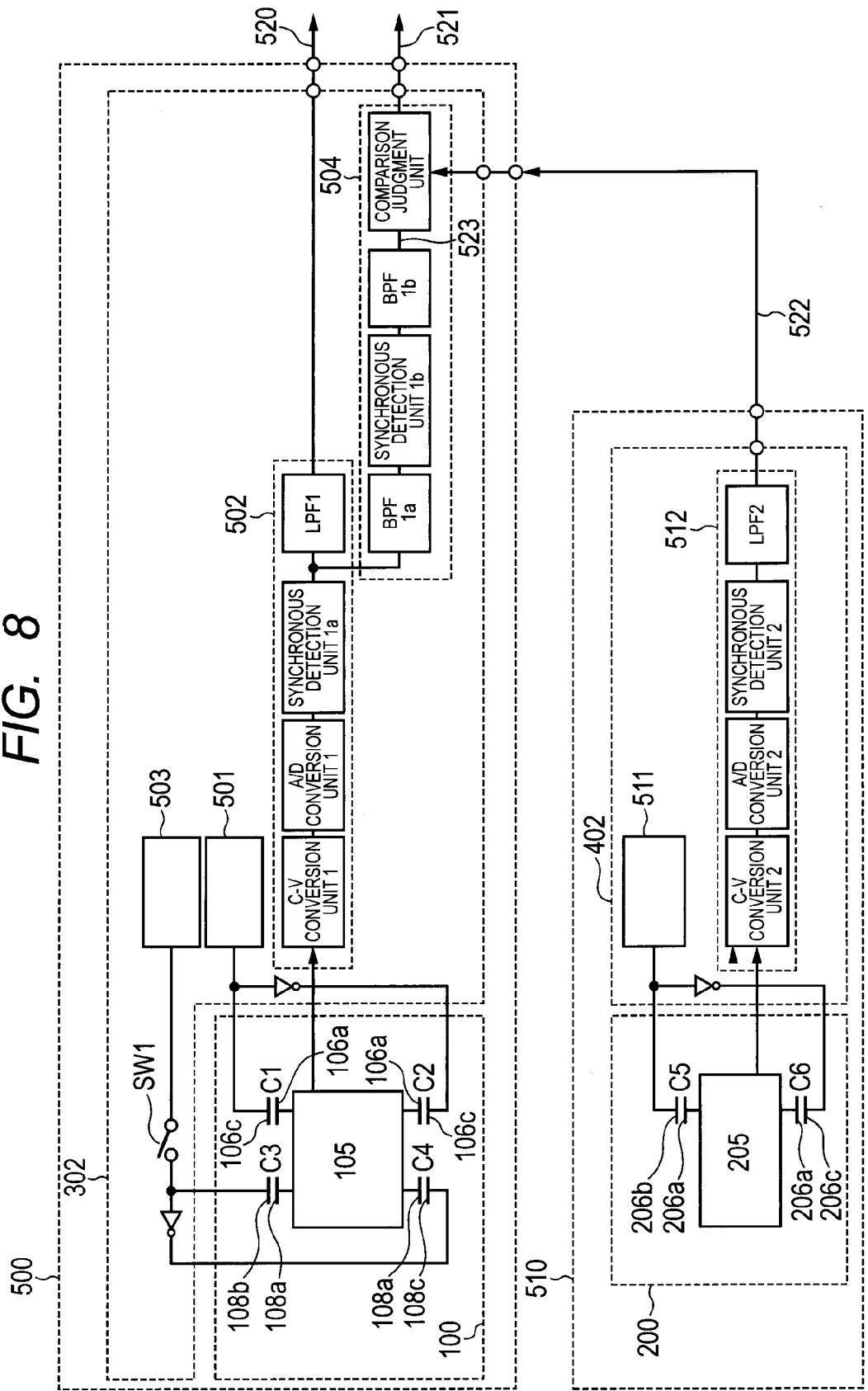
FIG. 8 is a block diagram showing the acceleration sensor which is the inertial sensor equivalent to the first embodiment of the present invention.

FIG. 8 shows the configuration of the acceleration sensor which is the inertial sensor equivalent to the first embodiment.

As shown in FIG. 8, the first acceleration sensor 500 in the first embodiment is provided with the semiconductor chip 100 and the semiconductor chip 302, the MEMS structure is formed in the semiconductor chip 100, and the signal processing circuit is formed in the semiconductor chip 302.

First, in FIG. 8, the movable part 105 of the MEMS structure formed in the semiconductor chip 100 is shown and a capacitative element C1 which is a capacitive detector is formed between the movable part 105 and a modulating signal generator 501. The capacitative element C1 is formed by the movable electrode for detection 106a and the fixed electrode for detection 106b. Besides, a capacitative element C2 is formed between the movable part 105 and the modulating signal generator 501. The capacitative element C2 is configured by the movable electrode for detection 106a and the fixed electrode for detection 106c.

Next, the configuration of the signal processing circuit formed in the semiconductor chip 302 will be described. As shown in FIG. 8, the modulating signal generator 501 that generates a modulating signal (a carrier wave) is formed in the semiconductor chip 302. The modulating signal generator 501 can generate a modulating signal of several hundred kHz for example. Bias voltage is applied to a modulating signal generated in the modulating signal generator 501 and the modulating signal to which the bias voltage is applied is applied to the fixed electrode for detection 106b. Besides, bias voltage is applied to a signal acquired by converting a phase of a modulating signal generated in the modulating signal generator 501 by 180 degrees and the signal to which the bias voltage is applied is applied to the fixed electrode for detection 106c. Hereby, the movable part 105 is oscillated by the modulating signal of several hundred kHz.

Next, a physical quantity calculating machine 502 is formed in the semiconductor chip 302. The physical quantity calculating machine 502 is provided with a capacity-voltage conversion unit 1 (a C-V conversion unit 1), an A/D conversion unit 1, a first synchronous detection unit 1a and a low-pass filter LPF1. The capacity-voltage conversion unit 1 is configured by an operational amplifier that converts the variation of the capacity of the capacitative element C1 to a voltage signal. Next, the A/D conversion unit 1 converts an analog signal output from the capacity-voltage conversion unit 1 to a digital signal and the first synchronous detection unit 1a restores the original low-frequency signal from a signal converted to a high-frequency signal by a carrier wave. Besides, the low-pass filter LPF1 attenuates a high-frequency signal and passes the low-frequency signal, and an acceleration signal 520 is calculated based upon the signal that passes the low-pass filter LPF1.

The first acceleration sensor in the first embodiment is configured as described above and next, operation that detects acceleration will be described below.

First, a modulating signal of several hundred kHz (a carrier frequency) generated in the modulating signal generator 501 is applied to the fixed electrode for detection 106b and a signal acquired by converting a phase of the modulating signal generated in the modulating signal generator 501 by 180 degrees is applied to the fixed electrode for detection 106c. Then, the movable part 105 is oscillated at the carrier frequency (several hundred kHz). As the oscillation is very fast, the variation of the capacity of the capacitative element C1 and the capacitative element C2 by the oscillation can be regarded as none. When acceleration is applied from the outside in this state, the movable part 105 is displaced. For example, when the movable part 105 is displaced on the upside in FIG. 8, distance between the movable electrode for detection 106a and the fixed electrode for detection 106b narrows in the capacitative element C1 and therefore, the capacity of the capacitative element C1 is increased. In the meantime, in the capacitative element C2, as distance between the movable electrode for detection 106a and the fixed electrode for detection 106c is widened, the capacity of the capacitative element C2 decreases. The variation of the capacity of the capacitative element C1 and the variation of the capacity of the capacitative element C2 become the variation of an external force response frequency (DC to several tens Hz) corresponding to acceleration applied from the outside. However, in this case, as the modulating signal is applied to the movable part 105, the variation of the external force response frequency (DC to several tens Hz) is superimposed on the carrier frequency (several hundred kHz).

Afterward, a voltage signal acquired by converting the variation of capacity to voltage in the capacity-voltage conversion unit 1 is output based upon the variation of capacity in the capacitative element C1 and an amplitude of the modulating signal. In the voltage signal (the analog signal) output from the capacity-voltage conversion unit 1, a voltage signal of the external force response frequency (DC to several tens Hz) is superimposed on the carrier frequency (several hundred kHz).

Next, the voltage signal output from the capacity-voltage conversion unit 1 in which the voltage signal of the external force response frequency (DC to several tens Hz) is superimposed on the carrier frequency (several hundred kHz) is input to the A/D conversion unit 1 and is converted to a digital signal in the A/D conversion unit 1. The voltage signal converted to the digital signal is input to the first synchronous detection unit 1*a*.

In the first synchronous detection unit 1*a*, synchronous detection is performed using a frequency and a phase of the modulating signal. That is, in the first synchronous detection unit 1*a*, the voltage signal of the external force response frequency (DC to several tens Hz) is restored from the voltage signal (the digital signal) in which the voltage signal of the external force response frequency (DC to several tens Hz) is superimposed on the carrier frequency (several hundred kHz). Afterward, the restored voltage signal is input to the low-pass filter (LPF1) and a high-frequency component except a required signal is attenuated. An acceleration signal 520 is calculated based upon a voltage signal (DC to several tens Hz) output from the low-pass filter LPF1 and is output. As described above, acceleration can be detected by the acceleration sensor in the first embodiment. At this time, as the variation of electrostatic capacity of DC to several tens Hz by acceleration is superimposed on a high-frequency signal by oscillating the movable part 105 of the acceleration sensor with a carrier wave of several hundred kHz as described above and signal processing is applied to the high-frequency signal, SN ratio can be enhanced, inhibiting an effect of 1/f noise and the detection precision of an acceleration signal can be enhanced.

As shown in FIG. 8, the second acceleration sensor 510 in the first embodiment is provided with the semiconductor chip 200 and the semiconductor chip 402, the MEMS structure is formed in the semiconductor chip 200, and the signal processing circuit is formed in the semiconductor chip 402.

In FIG. 8, the movable part 205 of the MEMS structure formed in the semiconductor chip 200 is shown and a capacitative element C5 that functions as a capacitive detector is formed between the movable part 205 and a modulating signal generator 511. The capacitative element C5 is configured by the movable electrode for detection 206*a* and the fixed electrode for detection 206*b*. In addition, a capacitative element C6 is formed between the movable part 205 and the modulating signal generator 511. The capacitative element C6 is configured by the movable electrode for detection 206*a* and the fixed electrode for detection 206*c*.

Next, the configuration of the signal processing circuit formed in the semiconductor chip 402 will be described. As shown in FIG. 8, in the semiconductor chip 402, the modulating signal generator 511 that generates a modulating signal (a carrier wave) is formed. The modulating signal generator 511 is configured so that a modulating signal of several hundred kHz for example can be generated. Bias voltage is applied to a modulating signal generated in the modulating signal generator 511 and it is applied to the fixed electrode for detection 206*b*. Besides, bias voltage is applied to a signal acquired by converting a phase of the modulating signal generated in the modulating signal generator 511 by 180 degrees and it is applied to the fixed electrode for detection 206*c*. Hereby, the movable part 205 is oscillated by the modulating signal of several hundred kHz.

Next, a physical quantity calculating machine 512 is formed in the semiconductor chip 402. The physical quantity calculating machine 512 is provided with a capacity-voltage conversion unit 2 (a C-V conversion unit 2), an A/D conversion unit 2, a synchronous detection unit 2 and a low-pass filter LPF2. The capacity-voltage conversion unit 2 is configured by an operational amplifier that coverts the variation of the capacity of the capacitative element C5 to a voltage signal. Next, the A/D conversion unit 2 converts the analog signal output from the capacity-voltage conversion unit 2 to a digital signal and the first synchronous detection unit 2 restores the original low-frequency signal from the signal converted to the high-frequency signal by the carrier wave. In addition, the low-pass filter LPF2 attenuates a high-frequency signal so as to pass a low-frequency signal and calculates an acceleration signal based upon the signal that passes the low-pass filter LPF2.

The second acceleration sensor in the first embodiment is configured as described above. Next, operation that detects acceleration will be described.

First, a modulating signal of several hundred kHz (a carrier frequency) generated in the modulating signal generator 511 is applied to the fixed electrode for detection 206*b* and a signal acquired by converting a phase of the modulating signal generated in the modulating signal generator 511 by 180 degrees is applied to the fixed electrode for detection 206*c*. Then, the movable part 205 is oscillated at the carrier frequency (several hundred kHz). As this oscillation is very fast, the variation of the capacity of the capacitative element C5 and the capacitative element C6 by the oscillation can be regarded as none. In this state, when acceleration is applied from the outside, the movable part 205 is displaced.

For example, when the movable part 205 is displaced on the upside in FIG. 8, distance between the movable electrode for detection 206*a* and the fixed electrode for detection 206*b* narrows in the capacitative element C5 and therefore, the capacity of the capacitative element C5 is increased. In the meantime, as distance between the movable electrode for detection 206*a* and the fixed electrode for detection 206*c* is widened in the capacitative element C6, the capacity of the capacitative element C6 decreases. The variation of the capacity of the capacitative element C5 and the variation of the capacity of the capacitative element C6 become the variation of an external force response frequency (Dc to several kHz) corresponding to acceleration applied from the outside. However, in this case, as the modulating signal is applied to the movable part 205, the variation of the external force response frequency (DC to several kHz) is superimposed on the carrier frequency (several hundred kHz).

Afterward, a voltage signal in which the variation of the capacity is converted to voltage based upon the variation of capacity in the capacitative element C5 and an amplitude of the modulating signal in the capacity-voltage conversion unit 2 is output. A voltage signal of the external force response frequency (DC to several kHz) is superimposed on the carrier frequency (several hundred kHz) in the voltage signal (the analog signal) output from the capacity-voltage conversion unit 2.

Next, the voltage signal output from the capacity-voltage conversion unit 2 (the voltage signal in which the voltage signal of the external force response frequency (DC to several kHz) is superimposed on the carrier frequency (several hundred kHz)) is input to the A/D conversion unit 2 and is converted to a digital signal in the A/D conversion unit 2. The voltage signal converted to the digital signal is input to the synchronous detection unit 2.

In the synchronous detection unit 2, synchronous detection is performed using a frequency and a phase of the modulating signal. That is, in the synchronous detection unit 2, the voltage signal of the external force response frequency (DC to several kHz) is restored from the voltage signal (the digital signal) in which the voltage signal of the external force response frequency (DC to several kHz) is superimposed on the carrier frequency (several hundred kHz). Afterward, the restored voltage signal is input to the low-pass filter LPF2 and a high-frequency component except a required signal is attenuated. An acceleration signal is calculated based upon a voltage signal (DC to several kHz) output from the low-pass filter LPF2 and is output. As described above, acceleration can be detected by the acceleration sensor in the first embodiment.

The above-mentioned first acceleration sensor is used for a key device in an attitude control system that inhibits a side skid and spin of a vehicle for example and supports safe running. The attitude control system inhibits a side skid and spin of a vehicle by controlling the output of an engine and braking force by a brake based upon output from the acceleration sensor. Therefore, failure of the acceleration sensor may cause an accident at high probability and the failure of the acceleration sensor is required to be promptly informed.

Then, it is desirable from a viewpoint of promptly detecting failure that the diagnosis of whether the acceleration sensor fails or not, operating it is enabled. Accordingly, some acceleration sensors are provided with a function for diagnosing whether the acceleration sensors fail or not, operating them. As for the acceleration sensor in the first embodiment, it can be diagnosed whether it fails or not with it operated and the configuration of the first acceleration sensor provided with a constant diagnostic function for judging whether the acceleration sensor fails or not, detecting acceleration will be described below.

In FIG. 8, the movable part 105 of the MEMS structure formed in the semiconductor chip 100 is shown, and a capacitative element C3 and a capacitative element C4 which are respectively a forced oscillation generating part are formed between the movable part 105 and a diagnostic signal generator 503. The capacitative element C3 is formed by the movable electrode for diagnosis 108a and the fixed electrode for diagnosis 108b. The capacitative element C4 is formed by the movable electrode for diagnosis 108a and the fixed electrode for diagnosis 108c. The diagnostic signal generator 503 itself is well-known.

Next, in the semiconductor chip 302, the diagnostic signal generator 503 that generates a diagnostic signal and an abnormality determination device 504 are formed. The diagnostic signal generator 503 is configured so that a diagnostic signal of several hundred Hz for example can be generated. The diagnostic signal is configured by a rectangular wave, a sine wave or a chopping wave for example. Bias voltage is applied to a diagnostic signal generated in the diagnostic signal generator 503 and it is applied to the capacitative element C3 and the capacitative element C4. Besides, the abnormality determination device 504 is connected to the movable part 105 via the physical quantity calculating machine 502 formed in the semiconductor chip 302.

In the acceleration sensor configured as described above, a diagnostic signal generated in the diagnostic signal generator 503 is applied to the fixed electrode for diagnosis 108b and the fixed electrode for diagnosis 108c as two signals which mutually have anti-phases. Hereby, electrostatic force acts between the movable electrode for diagnosis 108a and the fixed electrode for diagnosis 108b and between the movable electrode for diagnosis 108a and the fixed electrode for diagnosis 108c, and the movable part 105 can be forcedly oscillated. When the movable part 105 is forcedly oscillated, the movable part 105 is displaced and the variation of capacity occurs in the capacitative element C1 and the capacitative element C2 which respectively function as a capacitive detector.

The variation of capacity caused in the capacitative element C1 and the capacitative element C2 is converted to a voltage signal in the capacity-voltage conversion unit 1 and the voltage signal converted in the capacity-voltage conversion unit is restored to the original diagnostic signal via the A/D conversion unit 1 and the first synchronous detection unit 1a. The restored diagnostic signal is input to the abnormality determination device 504, is processed there, and it is judged whether the restored diagnostic signal is abnormal or not. According to the first acceleration sensor in the first embodiment, it is judged whether the acceleration sensor is abnormal or not as described above.

Further, when a diagnostic signal of several hundred Hz is applied to the movable part 105 and acceleration (DC to several tens Hz) is applied from the outside with the movable part forcedly oscillated, the variation (several hundred Hz) of capacity by forced oscillation and the variation (DC to several tens Hz) of capacity by acceleration occur in the capacitative element C1 and the capacitative element C2 which respectively function as a capacitive detector. The variation of several hundred Hz of capacity and the variation of DC to several tens Hz of capacity are superimposed on the modulating signal (several hundred kHz).

Afterward, the variations of capacity are converted to a voltage signal in the capacity-voltage conversion unit 1. In the voltage signal, a voltage signal of several hundred Hz and a voltage signal of DC to several tens Hz are superimposed on the modulating signal (several hundred kHz). Afterward, the voltage signal is restored to a diagnostic signal of several hundred Hz and the voltage signal of DC to several tens Hz via the A/D conversion unit 1 and the first synchronous detection unit 1a. In the physical quantity calculating machine 502, the diagnostic signal of several hundred Hz is attenuated by the low-pass filter LPF1, the voltage of DC to several tens Hz is extracted, and an acceleration signal is calculated based upon the voltage signal. In the meantime, in the abnormality determination device 504, processing is executed based upon the diagnostic signal of several hundred Hz and abnormality is judged. According to the acceleration sensor in the first embodiment, it can be judged whether the acceleration sensor is abnormal or not, detecting acceleration as described above.

A characteristic of the acceleration sensor in this embodiment is that an output signal (an acceleration signal) 522 from the second acceleration sensor is input to the abnormality determination device 504 of the first acceleration sensor. This reason will be described below.

An inertial sensor utilized for inhibiting a side skid and spin of a vehicle is installed in a running vehicle. In the vehicle in which the inertial sensor is installed, multiple vibrations including vibration caused in getting over irregularities and an obstacle on a road surface, vibration caused by an engine which is a power source of the vehicle and vibration caused by opening/closing a valve on piping for controlling the engine and a brake exist. Such vibration and impact do not constantly have a fixed dimension and a fixed frequency and also temporally vary. Especially, the duration in a time domain of vibration caused by the impact of objects is short; however, as the vibration includes the acceleration oscillation of all frequencies in a frequency domain, it is difficult to specify a dimension and a frequency of caused vibration.

Besides, an inertial sensor utilized for an internal angle sensor for recognizing its own state of a mobile robot used in a field of nursing and medical care is installed inside the mobile robot. In the mobile robot, multiple vibrations including vibration caused by repeating touch to a person, vibration caused in getting over irregularities and an obstacle on a floor surface in movement and vibration caused when the mobile robot collides with a wall surface exist. Such vibration and impact do not constantly have a fixed dimension and a fixed frequency and also temporally vary. Especially, the duration in a time domain of vibration caused by the impact of objects is short; however, as the vibration includes the acceleration oscillation of all frequencies in a frequency domain, it is difficult to specify a dimension and a frequency of caused vibration.

That is, in environment in which the acceleration sensor in the first embodiment that can judge whether the acceleration sensor is abnormal or not, detecting acceleration is installed, vibration a dimension, a frequency and the duration of which cannot be predicted results. The vibration is noisy vibration differently from an acceleration signal to be measured by the sensor.

If noisy vibration in environment in which the sensor is installed has the same frequency as oscillation that forcedly oscillates the movable part 105 by a diagnostic signal generated in the diagnostic signal generator 503 and has an antiphase, the forced oscillation of the movable part 105 is offset by noisy vibration in the environment in which the sensor is installed and a desired amplitude of forced oscillation is not acquired. That is, though the sensor is not abnormal, the abnormality determination device 504 judges that the sensor is abnormal and the sensor outputs a wrong diagnostic result.

As noisy vibration in the environment in which the sensor is installed does not constantly have a fixed dimension and a fixed frequency and also temporally varies, wrong diagnosis can be regarded as probably caused. Then, a method of statistically judging whether the sensor is abnormal or not after diagnosis is determined by plural times or more is conceivable, however, in this case, as a result of the determination is output after diagnosis is determined by plural times, it takes time since the sensor actually fails until a result of determination that the sensor is abnormal is output. Accordingly, the method of statistically judging whether the sensor is abnormal or not after diagnosis is determined by plural times or more is not desirable from a viewpoint of promptly detecting whether the acceleration sensor fails or not.

In the meantime, as it can be detected whether noisy vibration is caused or not in the environment in which the sensor is installed, detecting an acceleration signal in the first acceleration sensor when the output signal (the acceleration signal) 522 from the second acceleration sensor is input to the sensor abnormality determination device 504 via an external control circuit of a sensor unit or via an external conductor as in the first acceleration sensor in the first embodiment, it can be constantly detected whether there is possibility that the abnormality determination device 504 makes the wrong diagnosis of the sensor or not. When there is possibility that the abnormality determination device 504 makes the wrong diagnosis of the sensor because of noisy vibration in the environment in which the sensor is installed, the reliable acceleration sensor that inhibits wrong diagnosis can be provided by changing a method of determination in the abnormality determination device 504 even if diagnosis is made in environment having noise made by vibration, detecting acceleration.

Especially, in this embodiment, as a response band of the second acceleration sensor is wider than that of the first acceleration sensor and in addition, a range of the sensitivity of the second acceleration sensor is wider than that of the first acceleration sensor, noise made by vibration in a wider frequency band and a wider range of acceleration can be detected when noisy vibration in the environment in which the sensor is installed is detected by the second acceleration sensor. Therefore, even if diagnosis is made in the environment having noise, detecting acceleration, wrong diagnosis is inhibited and the further reliable acceleration sensor can be provided.

Next, the detailed configuration of the abnormality determination device 504 shown in FIG. 8 will be described.

As shown in FIG. 8, the abnormality determination device 504 is provided with a band-pass filter BPF1a, a second synchronous detection unit 1b, a band-pass filter BPF1b and a comparison judgment unit. The band-pass filter BPF1a is configured so that a signal except the voltage signal of several hundred Hz output from the first synchronous detection unit 1a is regarded as noise and is removed. The second synchronous detection unit 1b is configured so that the diagnostic signal of several hundred Hz is extracted from the signal including the diagnostic signal of several hundred Hz and the voltage signal of DC to several tens Hz output from the first synchronous detection unit 1a of the physical quantity calculating machine 502. Concretely, when the diagnostic signal of several hundred Hz is cos wt, the signal including the diagnostic signal of several hundred Hz (cos wt) and the voltage signal of DC to several tens Hz is multiplied by cos wt in the second synchronous detection unit 1b. Then, the diagnostic signal of several hundred Hz is expressed as "cos wt×cos wt=½ (cos 2 wt+cos 0)". That is, the diagnostic signal of several hundred Hz is converted to a signal (a signal of a second detection frequency) having a double frequency (cos 2wt) of the diagnostic signal and a dc signal (cos 0) (a signal of a first detection frequency). In the meantime, the voltage signal of DC to several tens Hz is multiplied by cos wt to be a signal in a band of several hundred Hz. As described above, the second synchronous detection unit 1b is configured so that it detects the diagnostic signal of several hundred Hz and converts it to the signal having the double frequency and the dc signal. A reference numeral 523 denotes the diagnostic signal.

Next, the band-pass filter BPF1b is configured so that it attenuates the dc signal (cos 0) and the signal of cos wt and passes the signal of cos 2wt (the signal having the double frequency of the diagnostic signal). The signal of cos 2wt (the signal having the double frequency of the diagnostic signal) to which the diagnostic signal of several hundred Hz is converted can be extracted by the band-pass filter BPF1b. The comparison judgment unit is configured so that it compares an amplitude of the signal of cos 2wt (the signal having the double frequency of the diagnostic signal) that passes the band-pass filter BPF1b and an amplitude reference value. It is output as a determination signal 521 based upon a result of comparison by the comparison judgment unit whether the acceleration sensor is abnormal or not.

The acceleration sensor in the first embodiment is configured as described above and operation for diagnosing whether the acceleration sensor is abnormal or not, detecting acceleration will be described below.

In FIG. 8, a diagnostic signal generated in the diagnostic signal generator 503 is applied to the fixed electrode for diagnosis 108b and the fixed electrode for diagnosis 108c as two signals mutually having an anti-phase. Hereby, electrostatic force acts between the movable electrode for diagnosis 108a and the fixed electrode for diagnosis 108b and between the movable electrode for diagnosis 108a and the fixed electrode for diagnosis 108c and the movable part 105 can be forcedly oscillated. When the movable part 105 is forcedly oscillated, the movable part 105 is displaced. When the movable part 105 is displaced, the variation of capacity occurs in the capacitative element C1 and the capacitative element C2 which respectively function as a capacitive detector.

When acceleration (DC to several tens Hz) is applied from the outside in this state, the variation of capacity (several hundred Hz) by forced oscillation and the variation of capacity (DC to several tens Hz) by acceleration occur in the capacitative element C1 and the capacitative element C2 which respectively function as a capacitive detector. The variation of capacity of several hundred Hz and the variation of capacity of DC to several tens Hz are superimposed on a modulating signal (several hundred kHz). Afterward, the above-mentioned variation of capacity is converted to a voltage signal in the capacity-voltage conversion unit 1. In the voltage signal, a voltage signal of several hundred Hz and a voltage signal of DC to several tens Hz are superimposed on the modulating signal (several hundred kHz). Afterward, the voltage signal is restored to a diagnostic signal of several hundred Hz and the voltage signal of DC to several tens Hz via the A/D conversion unit 1 and the first synchronous detection unit 1a. In the physical quantity calculating machine 502, the diagnostic signal of several hundred Hz is attenuated by the low-pass filter LPF1, the voltage signal of DC to several tens Hz is extracted, and an acceleration signal is calculated based upon the voltage signal.

In the meantime, a signal including the diagnostic signal of several hundred Hz and the voltage signal of DC to several tens Hz and output from the first synchronous detection unit 1a is input to the second synchronous detection unit 1b after a signal except the voltage signal of several hundred Hz output from the first synchronous detection unit 1a is removed by the band-pass filter BPF1a. In the second synchronous detection unit 1b, the diagnostic signal of several hundred Hz is converted to a signal having a double frequency (cos 2wt) of the diagnostic signal and a dc signal (cos 0). In the meantime, the voltage of DC to several tens Hz is multiplied by cos wt to be a signal in a band of several hundred Hz.

Next, a signal output from the second synchronous detection unit 1b is input to the band-pass filter BPF1b, a signal in a band of several hundred Hz acquired by multiplying the dc signal (cos 0) and the voltage signal of DC to several tens Hz by cos wt is attenuated, and a signal having the double frequency (cos 2wt) of the diagnostic signal and corresponding to the diagnostic signal is passed.

Afterward, the comparison judgment unit compares an amplitude of the signal having the double frequency (cos 2wt) of the diagnostic signal that passes the band-pass filter BPF1b and an amplitude reference value and judges whether the acceleration sensor is abnormal or not. As described above, according to the acceleration sensor in the first embodiment, it can be judged whether the acceleration sensor is abnormal or not, detecting acceleration. Accordingly, according to the acceleration sensor in the first embodiment, failure can be promptly detected.

Concretely, the comparison judgment unit can judge whether the acceleration sensor is abnormal or not as follows.

A predetermined amplitude reference value for example is set in the comparison judgment unit and is compared with the amplitude of the signal having the double frequency (cos 2wt) of the diagnostic signal that passes the band-pass filter BPF1b. For example, when the amplitude of the signal having the double frequency (cos 2wt) of the diagnostic signal that passes the band-pass filter BPF1b is substantially 0 (zero) though the diagnostic signal generated in the diagnostic signal generator 503 is applied to the movable part 105, the movable part 105 can be judged to be fastened and as a result, to be out of order. In the meantime, when a natural frequency of the movable part 105 decreases because the beam 104 is damaged and the movable part 105 is excessively displaced for applied acceleration (in a case that a scale of sensitivity is abnormal), the amplitude of the signal having the double frequency (cos 2wt) of the diagnostic signal that passes the band-pass filter BPF1b is larger than the amplitude reference value and therefore, the acceleration sensor can be judged to be abnormal.

Besides, in the acceleration sensor in this embodiment, as shown in FIG. 8, the diagnostic signal generated in the diagnostic signal generator 503 can be turned on/off by operating a switch SW1. Hereby, the following effects are acquired. For example, a case that environment in which the acceleration sensor in the first embodiment is installed has disturbance by vibration in the same frequency band as the diagnostic signal generated in the diagnostic signal generator 503 is supposed. In this case, when no switch SW1 is provided, it cannot be judged whether forced oscillation of the movable part 105 is applied by the diagnostic signal or by disturbance by vibration and there is possibility that wrong diagnosis is made. In the meantime, in the acceleration sensor in the first embodiment, the switch SW1 is provided. Therefore, an effect of disturbance by vibration in a background can be excluded by executing statistical data processing by periodically turning on/off the switch SW1, performing equalization by a method such as sample holding and judging failure using a differential value between output (the amplitude of the signal having the double frequency (cos 2wt) of the diagnostic signal that passes the band-pass filter BPF1b) when the switch SW1 is turned on and output (the amplitude of the signal having the double frequency (cos 2wt) of the diagnostic signal that passes the band-pass filter BPF1b) when the switch SW1 is turned off. That is, when the movable part 105 is oscillated by disturbance by vibration in the same frequency band as the diagnostic signal generated in the diagnostic signal generator 503, a predetermined output signal is output from the band-pass filter BPF1b independent of the turn on/off of the switch SW1. In the meantime, when the switch SW1 is turned on while the diagnostic signal generated in the diagnostic signal generator 503 is applied to the movable part 105, a predetermined output signal is output from the band-pass filter BPF1b, however, when the switch SW1 is turned off, output from the band-pass filter BPF1b is turned zero. Accordingly, when a differential value between output when the switch SW1 is turned on and output when the switch SW1 is turned off is calculated, it can be differentiated whether the forced oscillation of the movable part 105 depends upon the diagnostic signal or depends upon disturbance by vibration. Hereby, even if disturbance by vibration in the same frequency band as the diagnostic signal exists, the possibility of wrong diagnosis can be inhibited.

Further, in the acceleration sensor in this embodiment, as shown in FIG. 8, the output signal (the acceleration signal) 522 from the second acceleration sensor is input to the abnormality determination device 504 of the first acceleration sensor via the external control circuit of the sensor unit or the external conductor. Thereby, as it can be detected whether noisy vibration is caused or not in the environment in which the sensor is installed, detecting an acceleration signal by the first acceleration sensor, it can be constantly detected whether there is possibility that the abnormality determination device 504 makes the wrong diagnosis of the sensor caused when disturbance by vibration in the same frequency band as the diagnostic signal exists only in time equal to or shorter than one cycle of diagnosis or not.

Figure 9:
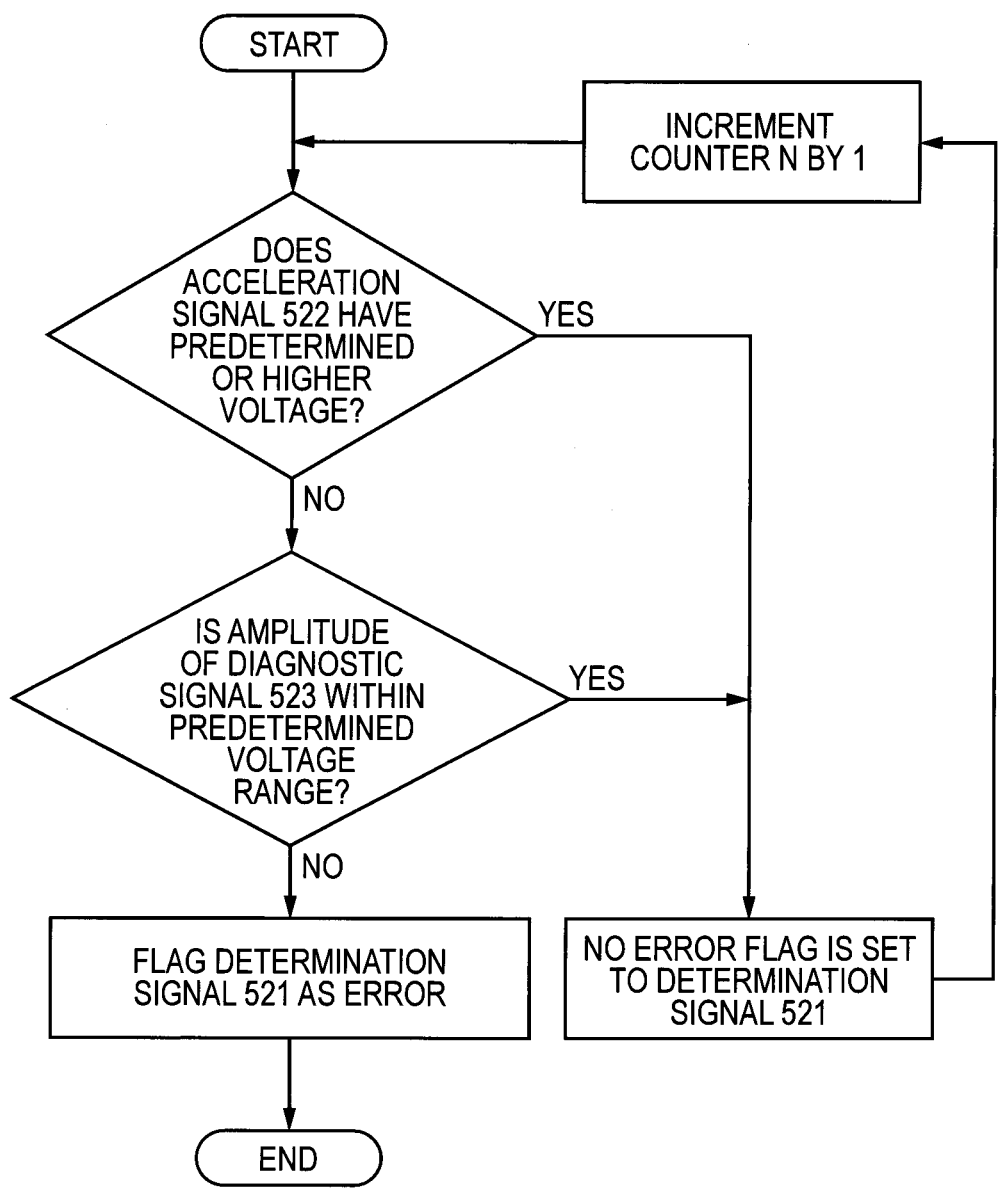
FIG. 9 is a flowchart showing a method of diagnosing the acceleration sensor which is the inertial sensor equivalent to the first embodiment of the present invention.

When there is the possibility that the abnormality determination device 504 makes the wrong diagnosis of the sensor because of noisy vibration in the environment in which the sensor is installed, the reliable acceleration sensor in which wrong diagnosis is inhibited can be provided by changing a method of determination in the abnormality determination device 504 even if diagnosis is made, detecting acceleration in environment including vibrational noise. Concretely, as shown in FIG. 9, a method of determination by the comparison judgment unit is defined. A case that the output signal (the acceleration signal) 522 from the second acceleration sensor has a predetermined voltage value or a higher voltage value means that noisy vibration exists in the environment in which the sensor is installed and that is, as the comparison judgment unit has high probability of wrong diagnosis, control is returned to a process for recomparison judgment without outputting an abnormality determination signal as the determination signal 521. When the output signal (the acceleration signal) 522 from the second acceleration sensor has a lower voltage value than the predetermined voltage value, a normal comparison judgment process is executed and it is determined whether the sensor is abnormal or not.

In the first embodiment, as the second acceleration sensor has a wider response band than the first acceleration sensor and a range of sensitivity of the second acceleration sensor is wider than that of the first acceleration sensor, vibrational noise in a wider frequency band and in a wider range of acceleration can be detected when noisy vibration in the environment in which the sensor is installed is detected by the second acceleration sensor. Thereby, even if diagnosis is made, detecting acceleration in the environment having noise, wrong diagnosis is inhibited and the further reliable acceleration sensor can be provided.

As described above, according to this embodiment, the inertial sensor that can inhibit wrong diagnosis can be provided because the second sensor is provided. Besides, vibrational noise in the wider frequency band and the wider range of acceleration can be detected by widening the range of sensitivity of the second sensor.

Second Embodiment

Referring to the drawings, an MEMS inertial sensor (a capacitance type sensor) in a second embodiment will be described below. In this embodiment, the MEMS inertial sensor in which a first inertial sensor is an acceleration sensor and a second inertial sensor is an angular velocity sensor will be described for an example below.

Figure 10:
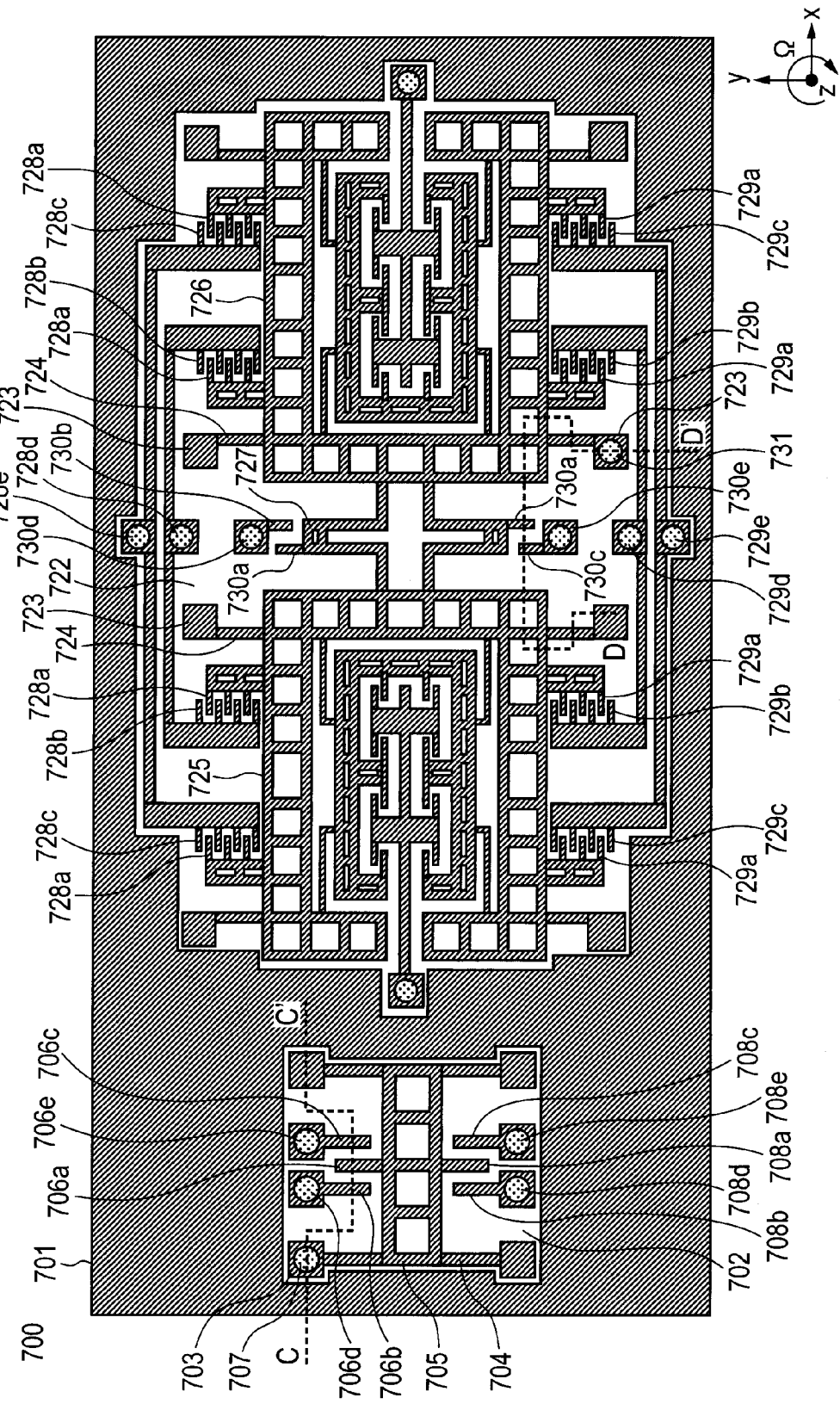
FIG. 10 is a plan showing MEMS structure that forms an inertial sensor equivalent to a second embodiment of the present invention.

FIG. 10 is a plan showing structure that configures the acceleration sensor which is the first inertial sensor formed in a semiconductor chip 700. As shown in FIG. 10, a frame 701 is formed in the semiconductor chip 700 and a cavity 702 is formed with the cavity enclosed by the frame 701. A fixed part 703 is provided inside the cavity 702 and a beam (an elastically deformed part) 704 is connected to the fixed part 703. The beam 704 is connected to a movable part 705 that functions as a weight of the acceleration sensor. That is, the fixed part 703 and the movable part 705 are connected via the elastically deformable beam 704 and the movable part 705 is configured so that it can be displaced in a direction shown by an arrow x in FIG. 10.

A movable electrode for detection 706a is integrated with the movable part 705, and a fixed electrode for detection 706b and a fixed electrode for detection 706c are formed opposite to the movable electrode for detection 706a. The movable electrode for detection 706a and the fixed electrode for detection 706b or the movable electrode for detection 706a and the fixed electrode for detection 706c respectively form a capacitative element and when the movable part 705 is displaced in the direction shown by the arrow x by acceleration applied from the outside, the capacity of the capacitative element varies. That is, the capacitative element respectively configured by the movable electrode for detection 706a and the fixed electrode for detection 706b or the movable electrode for detection 706a and the fixed electrode for detection 706c functions as a capacitive detector that detects the displacement in the direction shown by the arrow x of the movable part 705 as the variation of capacity.

Besides, a movable electrode for diagnosis 708a is integrated with the movable part 705, and a fixed electrode for diagnosis 708b and a fixed electrode for diagnosis 708c are formed opposite to the movable electrode for diagnosis 708a. The movable electrode for diagnosis 708a and the fixed electrode for diagnosis 708b or the movable electrode for diagnosis 708a and the fixed electrode for diagnosis 708c respectively form a capacitative element.

When a periodic diagnostic signal is applied between the movable electrode for diagnosis 708a and the fixed electrode for diagnosis 708b which respectively form the capacitative element and between the movable electrode for diagnosis 708a and the fixed electrode for diagnosis 708c which respectively form the capacitative element, electrostatic force acts between the movable electrode for diagnosis 708a and the fixed electrode for diagnosis 708b and between the movable electrode for diagnosis 708a and the fixed electrode for diagnosis 708c, and the movable electrode for diagnosis 708a is oscillated. When the movable electrode for diagnosis 708a is oscillated in the direction shown by the arrow x, the movable part 705 integrated with the movable electrode for diagnosis 708a is also oscillated. That is, the capacitative element configured by the movable electrode for diagnosis 708a and the fixed electrode for diagnosis 708b or the movable electrode for diagnosis 708a and the fixed electrode for diagnosis 708c functions as a forced oscillation generating part that forcedly oscillates the movable part 705 in the direction shown by the arrow x.

The structure of the acceleration sensor configured as described above is made of a semiconductor material such as silicon. Accordingly, the fixed part 703 and the movable part 705 mutually connected via the beam 704 are electrically connected and electric potential applied to the movable part 705 is supplied from a through electrode 707 formed in the fixed part 703. In the meantime, a through electrode 706d and a through electrode 706e are also respectively formed in the fixed electrode for detection 706b and the fixed electrode for detection 706c and the respective through electrodes are formed so that charge can flow into or can flow out of the fixed electrode for detection 706b and the fixed electrode for detection 706c according to the variation of capacity caused when the movable part 705 is displaced in the direction shown by the arrow x. Besides, a through electrode 708d and a through electrode 708e are also respectively formed in the fixed electrode for diagnosis 708b and the fixed electrode for diagnosis 708c and the respective through electrodes are formed so that a diagnostic signal can be applied to the fixed electrode for diagnosis 708b and the fixed electrode for diagnosis 708c from the through electrode 708d and the through electrode 708e.

Simultaneously, as shown in FIG. 10, the angular velocity sensor which is the second inertial sensor is also formed in the semiconductor chip 700. The configuration of the angular velocity sensor will be first described below.

A cavity 722 is formed with the cavity enclosed by a frame common to the frame 701 of the acceleration sensor which is the first inertial sensor, a fixed part 723 is provided inside the cavity 722, and a beam (an elastically deformed part) 724 is connected to the fixed part 723. The beam 724 is connected to movable parts 725, 726 which are two driven elements that function as a weight of the angular velocity sensor. That is, the movable parts 725, 726 which are the two driven elements and the fixed part 723 are connected via the elastically deformable beam 724 and the movable parts 725, 726 which are the driven elements can be respectively displaced in the direction shown by the arrow x in FIG. 10. Besides, the movable parts 725, 726 which are the driven elements form a tuning fork oscillation system that shares mutual vibrational energy and are connected by a link beam 727.

A movable electrode for driving 728a is integrated with the movable parts 725, 726 which are respectively the driven element, and a fixed electrode for driving 728b and a fixed electrode for driving 728c are formed opposite to the movable electrode for driving 728a. Electrostatic force acts between the movable electrode for driving 728a and the fixed electrode for driving 728b and between the movable electrode for driving 728a and the fixed electrode for driving 728c by applying a periodic driving signal expressed by "Vcom+Vb+Vd" between the movable electrode for driving 728a and the fixed electrode for driving 728b which respectively form a capacitative element by being mutually opposite, applying a periodic driving signal expressed by "Vcom+Vb−Vd" between the movable electrode for driving 728a and the fixed electrode for driving 728c and applying Vcom to the movable parts 725, 726 which are respectively the driven element via a common through electrode 731, and the movable electrode for driving 728a is oscillated.

When the movable electrode for driving 728a is oscillated in the direction shown by the arrow x, the movable parts 725, 726 which are integrated with the movable electrode for driving 728a and which are the driven element are oscillated out of phase. That is, the capacitative element configured by the movable electrode for driving 728a and the fixed electrode for driving 728b or the movable electrode for driving 728a and the fixed electrode for driving 728c functions as a forced oscillation generating part that forcedly oscillates the movable parts 725, 726 which are the driven element in the direction shown by the arrow x out of phase.

Besides, a movable electrode for driving amplitude monitoring 729a is integrated with the movable parts 725, 726 which are the driven element, and a fixed electrode for driving amplitude monitoring 729b and a fixed electrode for driving amplitude monitoring 729c are formed opposite to the movable electrode for driving amplitude monitoring 729a. The movable electrode for driving amplitude monitoring 729a and the fixed electrode for driving amplitude monitoring 729b or the movable electrode for driving amplitude monitoring 729a and the fixed electrode for driving amplitude monitoring 729c respectively form the capacitative element and when the movable parts 725, 726 which are the driven element are displaced in the direction shown by the arrow x by electrostatic force that acts between the movable electrode for driving 728a and the fixed electrode for driving 728b and between the movable electrode for driving 728a and the fixed electrode for driving 728c, the capacity of the capacitative element varies. That is, the capacitative element configured by the movable electrode for driving amplitude monitoring 729a and the fixed electrode for driving amplitude monitoring 729b or the movable electrode for driving amplitude monitoring 729a and the fixed electrode for driving amplitude monitoring 729c functions as a capacitive detector that detects the displacement in the direction shown by the arrow x of the movable parts 725, 726 which are the driven element as the variation of capacity.

Besides, a movable electrode for acceleration monitoring 730a is integrated with the link beam 727 that connects the movable parts 725, 726 which are the driven element, and a fixed electrode for acceleration monitoring 730b and a fixed electrode for acceleration monitoring 730c are formed opposite to the movable electrode for acceleration monitoring 730a. The movable electrode for acceleration monitoring 730a and the fixed electrode for acceleration monitoring 730b or the movable electrode for acceleration monitoring 730a and the fixed electrode for acceleration monitoring 730c respectively form a capacitative element and when the movable parts 725, 726 and the link beam 727 are displaced in the direction shown by the arrow x by acceleration applied from the outside, the capacity of the capacitative element varies. That is, the capacitative element configured by the movable electrode for acceleration monitoring 730a and the fixed electrode for acceleration monitoring 730b or the movable electrode for acceleration monitoring 730a and the fixed electrode for acceleration monitoring 730c functions as a capacitive detector that detects the displacement in the direction shown by the arrow x of the movable parts 725, 726 and the link beam 727 as the variation of capacity.

As described above, the structure of the acceleration sensor and the angular velocity sensor which are integrated in the semiconductor chip 700 is made of a semiconductor material such as silicon.

Accordingly, as for the acceleration sensor structure, the fixed part 703 and the movable part 705 mutually connected via the beam 704 are electrically connected and electric potential applied to the movable part 705 is supplied from the through electrode 707 formed in the fixed part 703 and connected to back wiring made of a semiconductor material such as silicon. In the meantime, the through electrode 706d and the through electrode 706e are also respectively formed in the fixed electrode for detection 706b and the fixed electrode for detection 706c and charge can flow into or out of the fixed electrode for detection 706b and the fixed electrode for detection 706c by the variation of capacity caused when the movable part 705 is displaced in the direction shown by the arrow x.

Similarly, as for the angular velocity sensor structure, the fixed part 723 and the movable parts 725, 726 that are the driven element, which are all mutually connected via the beam 724, are also electrically connected and electric potential applied to the movable parts 725, 726 is supplied from the through electrode 731 formed in the fixed part 723 and connected to back wiring made of a semiconductor material such as silicon. Besides, a through electrode 728d connected to back wiring made of a semiconductor material such as silicon is also formed in the fixed electrode for driving 728b so that a periodic driving signal expressed by "Vcom+Vb+Vd" can be applied between the movable electrode for driving 728a and the fixed electrode for driving 728b which respectively form the capacitative element. In addition, a through electrode 728e connected to back wiring made of a semiconductor material such as silicon is also formed in the fixed electrode for driving 728c so that a periodic driving signal expressed by "Vcom+Vb−Vd" can be applied between the movable electrode for driving 728a and the fixed electrode for driving 728c which respectively form the capacitative element. Further, a through electrode 729d and a through electrode 729e respectively connected to back wiring made of a semiconductor material such as silicon are also formed in the fixed electrode for driving amplitude monitoring 729b and the fixed electrode for driving amplitude monitoring 729c so that charge can flow into or out of the fixed electrode for driving amplitude monitoring 729b and the fixed electrode for driving amplitude monitoring 729c according to the variation of capacity caused when the movable parts 725, 726 which are respectively the driven element are displaced in the direction shown by the arrow x. Furthermore, a through electrode 730d connected to back wiring made of a semiconductor material such as silicon is also formed in the fixed electrode for acceleration monitoring 730b so that charge can flow into or out of the fixed electrode for acceleration monitoring 730b according to the variation of capacity caused when the movable parts 725, 726 and the link beam 727 are displaced in the direction shown by the arrow x.

Figure 11:
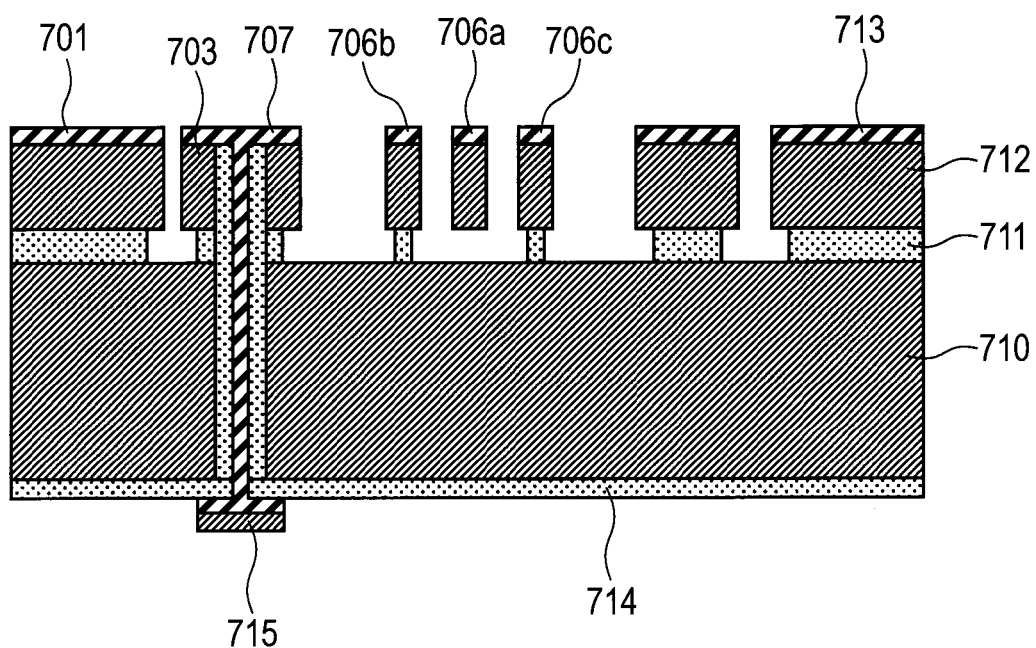
FIG. 11 is a sectional view showing the MEMS structure that forms an acceleration sensor which is a first inertial sensor that configures the inertial sensor shown in FIG. 10 when the MEMS structure is viewed along a line C-C' in FIG. 10.

FIG. 11 is a sectional view viewed along aline C-C' shown in FIG. 10. As shown in FIG. 11, in the semiconductor chip 700, an insulating oxide film 711 is formed on a substrate 710 and a silicon active layer 712 is formed on the insulating oxide film 711. That is, in the second embodiment, the semiconductor chip 700 that configures the acceleration sensor as the first inertial sensor is made of a silicon-on-insulator (SOI) substrate. The frame 701, the fixed part 703, the movable electrode for detection 706a integrated with the movable part 705, the fixed electrode for detection 706b and the fixed electrode for detection 706c which are all shown in FIG. 11 and the beam 704, the movable electrode for diagnosis 708a, the fixed electrode for diagnosis 708b and the fixed electrode for diagnosis 708c which are all not shown in FIG. 11 are formed by working the silicon active layer of the SOI substrate.

For example, FIG. 11 shows that the frame 701 and the fixed part 703 are formed on the insulating oxide film 711 and are fixed. In the meantime, for example, the movable electrode for detection 706a integrated with the movable part 705 is also made of the silicon active layer, however, the insulating oxide film 711 formed under the movable part 705 is removed. Similarly, the insulating oxide film formed under the beam 704 not shown in FIG. 11 is also removed. Accordingly, the movable part 705 is arranged in the cavity and is supported by the beam 704. Hereby, the movable part 705 is not completely fixed to the substrate 710 and is displaceably formed.

Besides, the through electrode 707 formed in the fixed part 703 is formed with the through electrode piercing the substrate 710, the insulating oxide film 711 and the silicon active layer 712 and is connected to a pad 715 formed on the back side of the substrate 710. Insulating materials 714 for mutually electrically insulating are formed opposite to through electrode materials 713 via the substrate 710, the insulating oxide film 711 and the silicon active layer 712 and as the silicon active layer 712 that configures the SOI substrate is made of conductive materials, electric potential of the movable part 705 connected to the fixed part 703 is the same as that of the pad 715 connected via the through electrode 707. All the through electrodes 706d, 706e, 708d, 708e which are not shown in FIG. 11 though they are shown in FIG. 10 are formed with the through electrodes piercing the substrate 710, the insulating oxide film 711 and the silicon active layer 712 like the through electrode 707, and are connected to respective pads formed on the back side of the substrate 710 and mutually electrically insulated.

Figure 12:
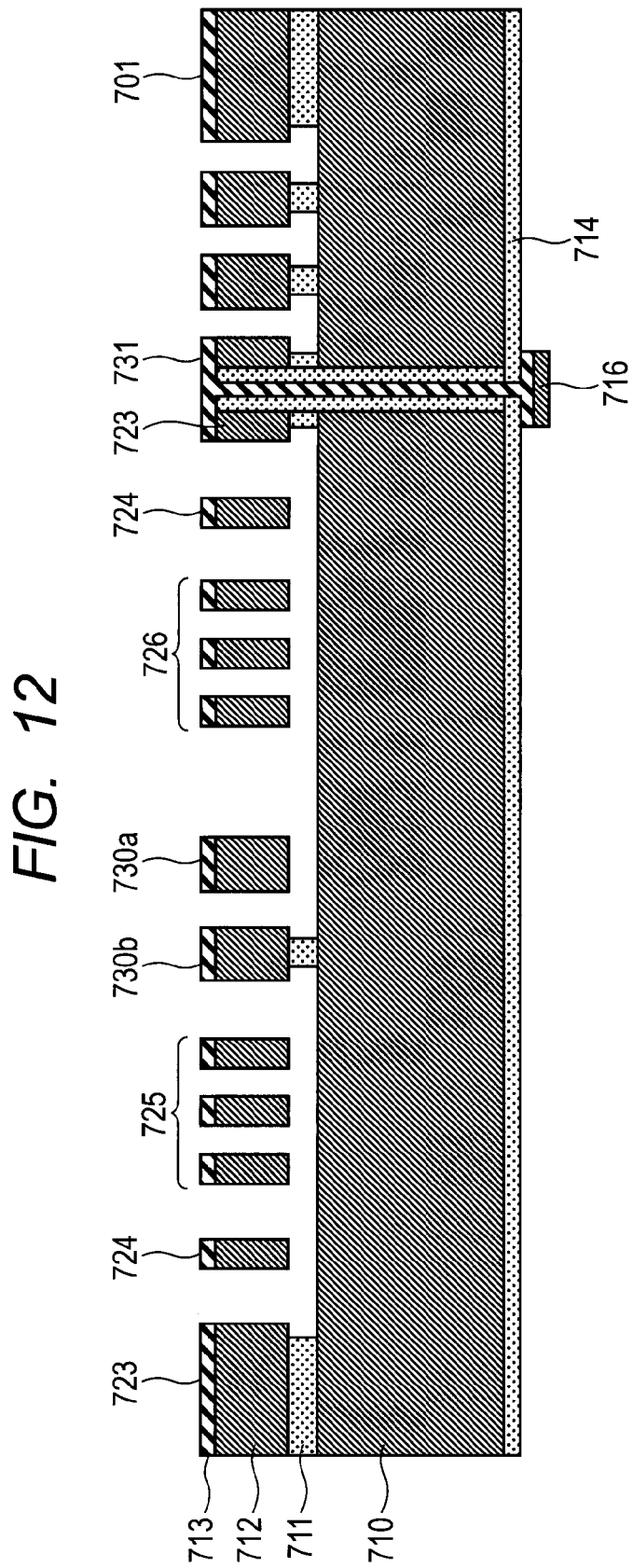
FIG. 12 is a sectional view showing MEMS structure that forms an angular velocity sensor which is a second inertial sensor that configures the inertial sensor shown in FIG. 10 when the MEMS structure is viewed along a line D-D' in FIG. 10.

FIG. 12 is a sectional view viewed along a line D-D' in FIG. 10. In the second embodiment, the semiconductor chip 700 that configures the angular velocity sensor which is the second inertial sensor is made of an SOI substrate integrated with the SOI substrate that configures the acceleration sensor which is the first inertial sensor shown in FIG. 11.

The frame 701, the fixed part 723, the beam 724, the movable parts 725, 726 which are the driven element, the movable electrode for acceleration monitoring 730a integrated with the link beam, the fixed electrode for acceleration monitoring 730 b which are all shown in FIG. 12 and the link beam 727, the movable electrode for driving 728a, the fixed electrodes for driving 728b, 728c, the movable electrode for driving amplitude monitoring 729a and the fixed electrodes for driving amplitude monitoring 729b, 729c which are all not shown in FIG. 12 are formed by working the silicon active layer of the SOI substrate. Accordingly, the movable parts 725, 276 which are the driven element are arranged in the cavity and are supported by the beam 724. Hereby, the movable parts 725, 276 are not completely fixed to the substrate 710 and are displaceably formed. Besides, the through electrode 731 formed in the fixed part 723 is formed with the through electrode piercing the substrate 710, the insulating oxide film 711 and the silicon active layer 712, and is connected to a pad 716 formed on the back side of the substrate 710. Insulating materials 714 for mutually electrically insulating are formed opposite to through electrode materials 713 via the substrate 710, the insulating oxide film 711 and the silicon active layer 712 and as the silicon active layer 712 that configures the SOI substrate is made of conductive materials, electric potential of the movable parts 725, 726 which are the driven element connected to the fixed part 723 and the link beam 727 is the same as that of the pad 716 connected to them via the through electrode 731.

All the through electrodes 728d, 728e, 729d, 729e, 730d, 730e which are not shown in FIG. 12 through they are shown in FIG. 10 are formed with them piercing the substrate 710, the insulating oxide film 711 and the silicon active layer 712 like the through electrode 731 and are connected to respective pads formed on the back side of the substrate 710 and mutually electrically insulated.

A case that the acceleration sensor which is the first inertial sensor and the angular velocity sensor which is the second inertial sensor in the second embodiment are formed by working the SOI substrates using photolithography and deep reactive ion etching (DRIE) for example is supposed. Naturally, in the second embodiment, the example that the acceleration sensor and the angular velocity sensor are manufactured using the SOI substrates is described and a concept in the second embodiment can be also applied to a case (a bulk MEMS process) that an acceleration sensor (MEMS structure) is formed by working both a surface and a back side of a silicon substrate using joining technique of glass, silicon and glass and others. Further, the concept in the second embodiment can be also applied to a case (a surface MEMS process) that an acceleration sensor (MEMS structure) is formed by repeating depositing a thin film on a surface of a silicon substrate where a signal processing circuit such as a transistor is formed beforehand and patterning the deposited thin film.

The semiconductor chip 700 where the acceleration sensor (the MEMS structure) which is the first inertial sensor and the angular velocity sensor (the MEMS structure) which is the second inertial sensor in the second embodiment are formed is configured as described above and a configuration example of mounting to be the semiconductor chip 700 will be described below. In the second embodiment, an example that the acceleration sensor (the MEMS structure) and the angular velocity sensor (the MEMS structure) and LSI that processes an output signal from the acceleration sensor and the angular velocity sensor are formed in separate semiconductor chips will be described, however, the present invention is not limited to the example, and the present invention can be also applied to a case that MEMS structure that forms an acceleration sensor and an angular velocity sensor and a transistor that configures a signal processing circuit are formed in the same semiconductor chip.

Figure 13:
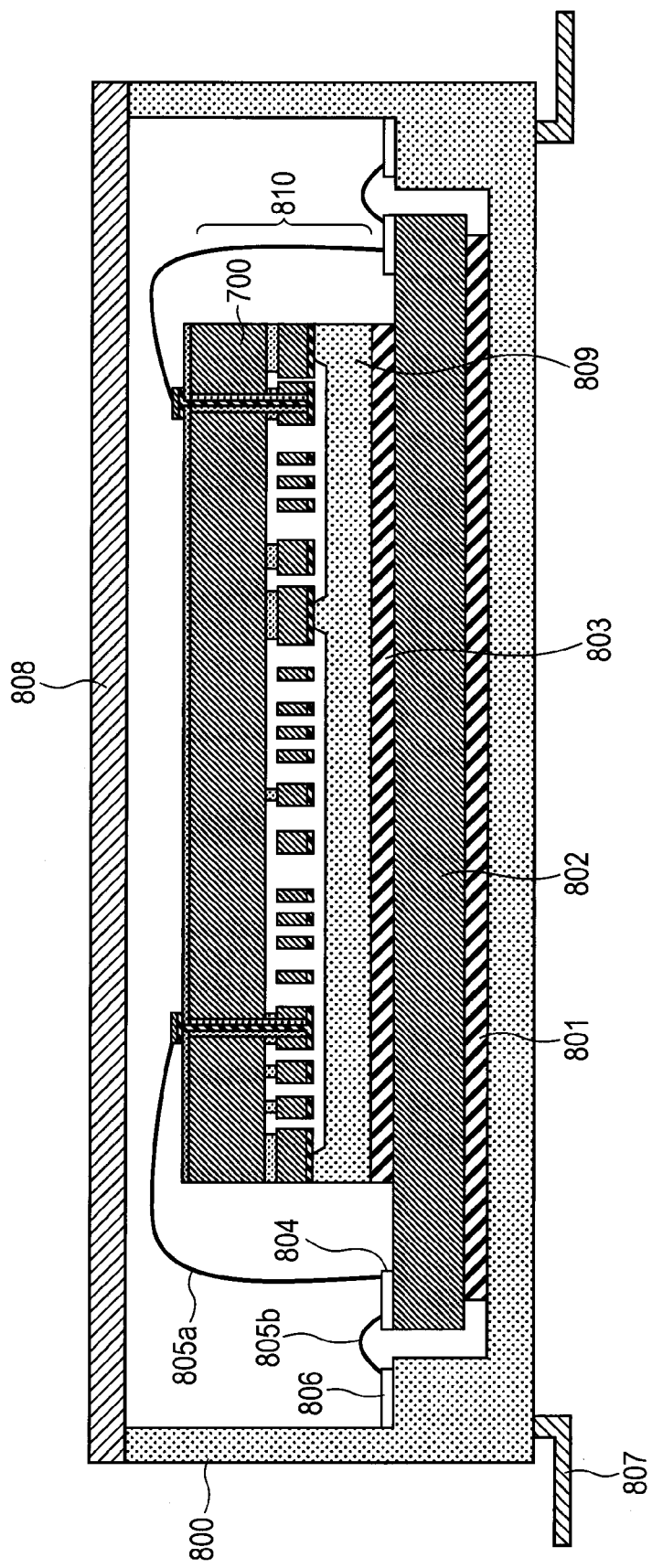
FIG. 13 is a sectional view showing structure in which the inertial sensor equivalent to the second embodiment of the present invention is mounted.

FIG. 13 is a sectional view showing the configuration example in which the acceleration sensor which is the first inertial sensor and the angular velocity sensor which is the second inertial sensor in the second embodiment are mounted. As shown in FIG. 13, a semiconductor chip 802 is mounted via an adhesive 801 at the bottom of an enclosure 800 provided with a concave portion. The enclosure 800 is made of a ceramic for example. In the semiconductor chip 802, an integrated circuit including a transistor and a passive device is formed by normal semiconductor manufacturing technique. The integrated circuit formed in the semiconductor chip 802 is provided with a function for processing an output signal from the acceleration sensor and the angular velocity sensor (MEMS structure) and finally outputs an acceleration signal and an angular velocity signal.

An MEMS chip 810 which covers the acceleration sensor and the angular velocity sensor respectively formed in the semiconductor chip 700 with a cap 809 and which is sealed and protected from an outside atmosphere is mounted over the semiconductor chip 802 via an adhesive 803. The cap 809 is made of a glass substrate for example and is joined to the semiconductor chip 700 made of the SOI substrate by anodic junction. The cap 809 is provided with space for enabling the movable part of the MEMS structure that forms the acceleration sensor and the angular velocity sensor to be operated. Besides, space in which the cap 809 and the MEMS structure that forms the acceleration sensor formed in the semiconductor chip 700 are installed and space in which the cap 809 and the MEMS structure that forms the angular velocity sensor formed in the semiconductor chip 700 are installed are separated by a groove or a projection formed in the cap 809. That is, the space in which the MEMS structure that forms the acceleration sensor is installed and the space in which the MEMS structure that forms the angular velocity sensor is installed are different in pressure. Besides, to inhibit the elapsed variation of pressure of the space in which the MEMS structure is operated, a gas absorption agent or a gas generation agent may be also installed in the space in which the cap 809 and the MEMS structure formed in the semiconductor chip 700 are installed.

In the semiconductor chip 700, the MEMS structure that forms the acceleration sensor which is the first inertial sensor and the angular velocity sensor which is the second inertial sensor respectively shown in FIG. 10 is formed. The pads formed in the semiconductor chip 700 and a pad 804 formed on the semiconductor chip 802 are connected via wire 805a for example. Further, the pad 804 formed on the semiconductor chip 802 is connected to a terminal 806 formed on the enclosure 800 via a wire 805b and is electrically connected to a terminal 807 that connects with the outside of the enclosure. The semiconductor chip 700 and the semiconductor chip 802 respectively arranged with them laminated in the enclosure 800 are sealed by putting a lid 808 on the enclosure 800.

As described above, the acceleration sensor which is the first inertial sensor and the angular velocity sensor which is the second inertial sensor in the second embodiment are mounted.

According to the inertial sensor provided with the acceleration sensor and the angular velocity sensor respectively shown in FIG. 13, a signal detected in the semiconductor chip 700 can be input to the semiconductor chip 802. Afterward, the signal input to the semiconductor chip 802 is processed in an integrated circuit formed in the semiconductor chip 802 and finally, an acceleration signal and an angular velocity signal respectively corresponding to acceleration are output. The acceleration signal output from the semiconductor chip 802 is output to the terminal 807 formed in the enclosure 800 via the wires 805a, 805b and can be extracted outside.

Next, a basic operational principle of the acceleration sensor and the angular velocity sensor in the second embodiment will be described.

As shown in FIG. 10, the acceleration sensor which is the first inertial sensor in the second embodiment is provided with the movable part 705 that can be displaced in the direction shown by the arrow x. For example, when acceleration is applied in the direction shown by the arrow x, the movable part 705 is displaced in the direction shown by the arrow x. When the movable part 705 is displaced, distance between the movable electrode for detection 706a and the fixed electrode for detection 706b or the movable electrode for detection 706a and the fixed electrode for detection 706c which respectively form the capacitative element varies and as a result, the capacitance of the capacitative element varies. The variation of capacity is converted to a voltage signal in the capacity-voltage conversion unit and an acceleration signal is output from the acceleration sensor based upon the converted electric signal.

Besides, as shown in FIG. 10, the angular velocity sensor which is the second inertial sensor in the second embodiment is provided with the movable parts 725, 726 which can be displaced in the direction shown by the arrow x and which are the driven element and the link beam 727 that connects the movable parts 725, 726. The movable parts 725, 726 which are the driven element are respectively provided with an electrode pair for driving 728a, 728b and an electrode pair for driving 728a, 728c. Electrostatic force acts between the movable electrode for driving 728a and the fixed electrode for driving 728b and between the movable electrode for driving 728a and the fixed electrode for driving 728c by applying a periodic driving signal expressed by "Vcom+Vb+Vd" between the movable electrode for driving 728a and the fixed electrode for driving 728b which respectively form the capacitative element by being mutually opposite, applying a periodic driving signal expressed by "Vcom+Vb−Vd" between the movable electrode for driving 728a and the fixed electrode for driving 728c and applying Vcom to the movable parts 725, 726 which are the driven element via the common through electrode 731, and the movable electrode for driving 728a is periodically oscillated. That is, the movable parts 725, 726 which are integrated with the movable electrode for driving 728a and which are the driven element are also periodically oscillated with the movable parts out of phase. An amplitude and an angular frequency of the periodic oscillation of the movable parts 725, 726 which are the driven element can be detected by detecting the variation of the capacitative element formed by the movable electrode for driving amplitude monitoring 729a integrated with the movable parts 725, 726 which are the driven element and the fixed electrode for driving amplitude monitoring 729b or the fixed electrode for driving amplitude monitoring 729c respectively formed opposite to the movable electrode for driving amplitude monitoring 729a. Hereby, during the operation of the angular velocity sensor, the periodic oscillation of the movable parts 725, 726 is controlled by an arithmetic circuit in the semiconductor chip 802 so that the periodic oscillation has a constantly fixed amplitude. Besides, during the operation of the angular velocity sensor, the periodic oscillation of the movable parts 725, 726 is controlled by the arithmetic circuit in the semiconductor chip 802 so that the periodic oscillation has a constantly fixed angular frequency.

When a dimension of angular velocity applied to the semiconductor chip 700 and having the z-axis as a rotation axis is Ω (deg/s), the mass of the movable parts 725, 726 which are the driven element is m (kg), the angular frequency of the periodic oscillation of the movable part is ωx (rad/s) and the amplitude of the periodic oscillation of the movable part is X (m), Coriolis force Fc that acts on the angular velocity sensor formed in the semiconductor chip 700 at time t (s) is expressed in the following expression (10).

[Mathematical expression 10]

$$F_c = 2m\Omega x \omega_x \cos(\omega_x t) \qquad (10)$$

As in the angular velocity sensor, Coriolis force Fc generated according to the expression (10) is calculated by operation, Coriolis force Fc acquired when the same angular velocity Ω is applied is larger in a case that the angular frequency ωx of the periodic oscillation and an amplitude X by oscillation are larger, considering that the mass m of the driven element does not vary. Therefore, as it is desirable that an angular frequency of forced oscillation of the driven element is set to be high and an amplitude of the forced oscillation is set to be larger, the angular frequency of the forced oscillation often utilizes a resonance amplitude utilizing a Q value (a mechanical quality factor) utilizing a resonance phenomenon of the driven element. However, as the stiffness constant in the direction shown by the arrow x of displacement is also turned high when a natural frequency of the driven element is set to be high, driving voltage applied to the electrode pair for driving to acquire a desired amplitude is turned high. Therefore, considering two viewpoints of energy consumption and acquiring large Coriolis force Fc, a frequency (acquired by multiplying the angular frequency by 2π) of the forced oscillation utilizing the resonance phenomenon of the driven element is often set to 3 to 20 kHz. That is, the natural frequency of the driven element of the angular velocity sensor is often set to 3 to 20 kHz.

Figure 14:
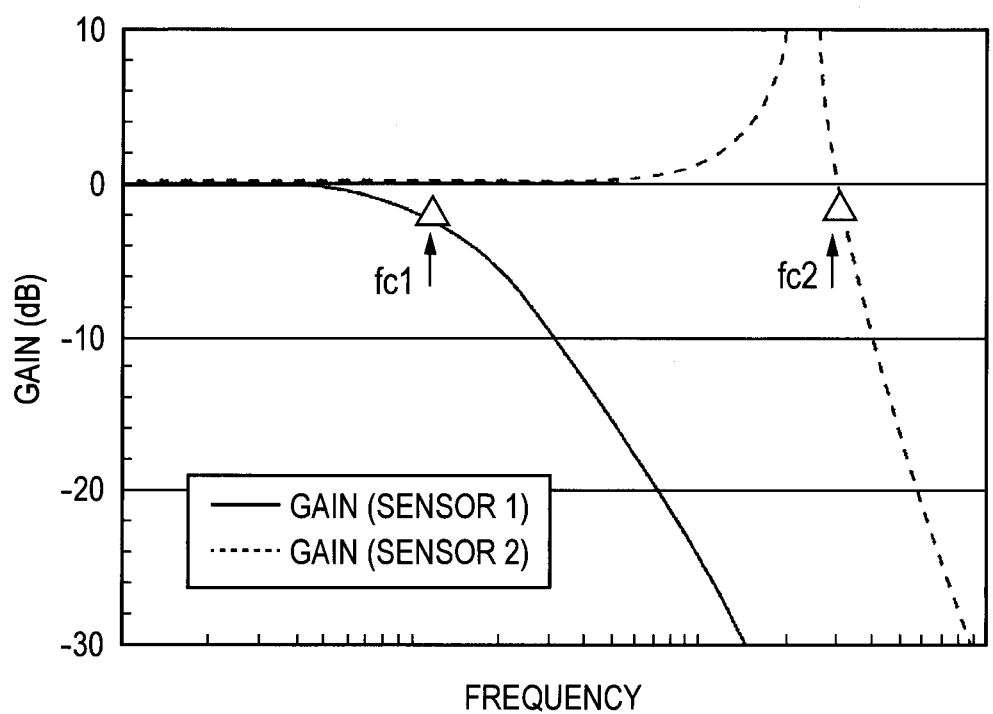
FIG. 14 shows a mechanical frequency response of the acceleration sensor which is the first inertial sensor and the angular velocity sensor which is the second inertial sensor in the inertial sensor equivalent to the second embodiment of the present invention.

When mechanical frequency responses of acceleration sensor which is the first inertial sensor and the angular velocity sensor which is the second inertial sensor in the second embodiment are shown in a graph, the graph can be expressed as shown in FIG. 14. This means that when a fluctuation frequency of acceleration applied to the sensor is gradually increased, the MEMS is mechanically operated up to fc1 (Hz) in the first sensor and is displaced, and means that the MEMS is mechanically operated up to fc2 (Hz) in the second sensor and is displaced. That is, in the second embodiment, it can be said that the angular velocity sensor which is the second inertial sensor has a wider response band than that of the acceleration sensor which is the first inertial sensor.

Figure 15:
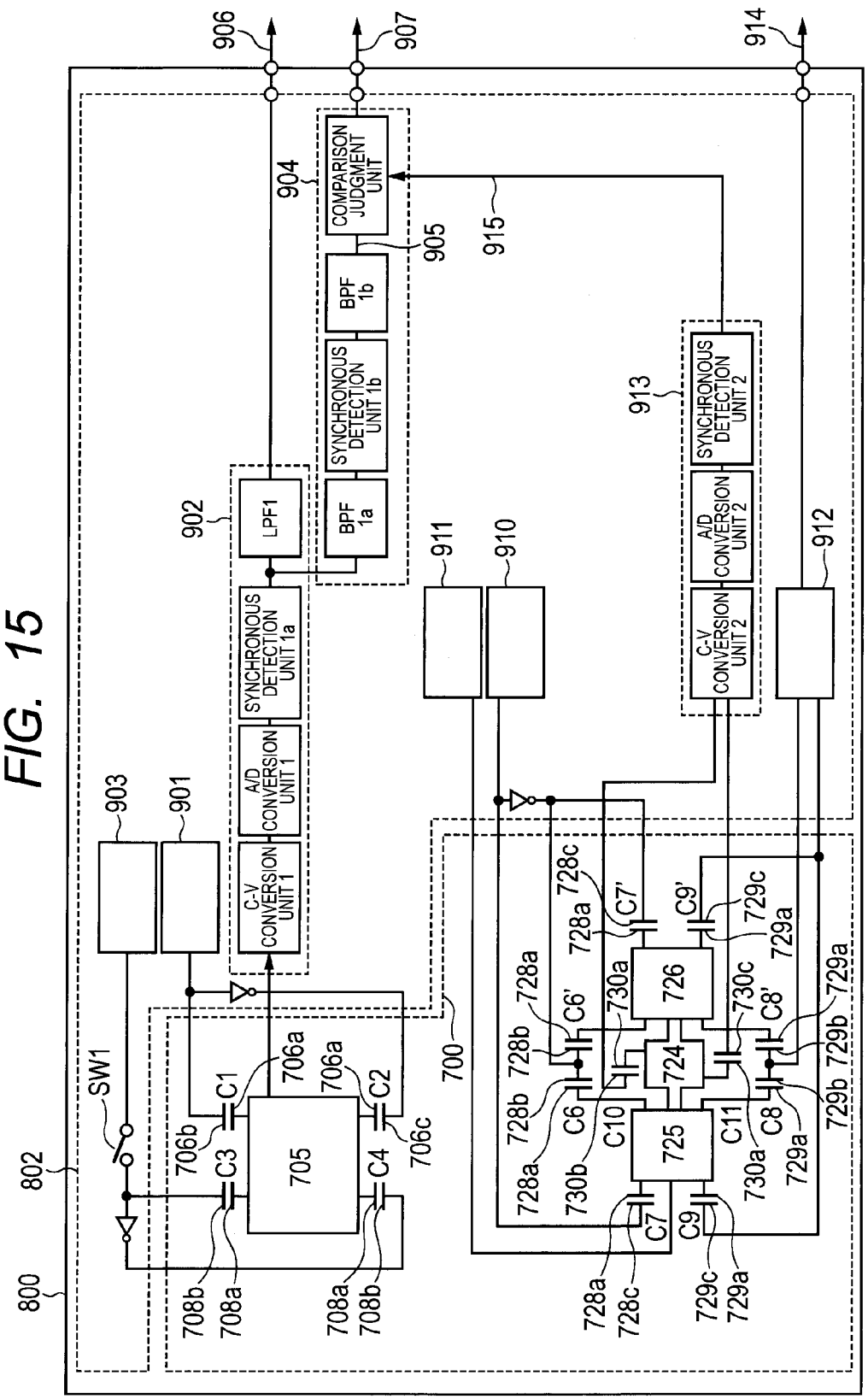
FIG. 15 is a block diagram showing the inertial sensor equivalent to the second embodiment of the present invention.

FIG. 15 shows the configuration of the acceleration sensor in the second embodiment.

As shown in FIG. 15, the acceleration sensor which is the first inertial sensor and the angular velocity sensor which is the second inertial sensor in the second embodiment are provided with the semiconductor chip 700 and the semiconductor chip 802, the MEMS structure is formed in the semiconductor chip 700, and the signal processing circuit is formed in the semiconductor chip 802.

First, the configuration and the operation of the signal processing circuit of the acceleration sensor which is the first inertial sensor will be described. In FIG. 15, the movable part 705 of the MEMS structure of the acceleration sensor formed in the semiconductor chip 700 is shown and a capacitative element C1 which functions as a capacitive detector is formed between the movable part 705 and a modulating signal generator 801. The capacitative element C1 is configured by the movable electrode for detection 706*a* and the fixed electrode for detection 706*b*. Besides, a capacitative element C2 is formed between the movable part 705 and the modulating signal generator. The capacitative element C2 is configured by the movable electrode for detection 706*a* and the fixed electrode for detection 706*c*.

Next, the configuration of the signal processing circuit formed in the semiconductor chip 802 will be described. In FIG. 15, in the semiconductor chip 802, the modulating signal generator 901 that generates a modulating signal (a carrier wave) is formed. The modulating signal generator 901 is configured so that a modulating signal of several hundred kHz for example can be generated. Bias voltage is applied to a modulating signal generated in the modulating signal generator 901 and it is applied to the fixed electrode for detection 706*b*. Besides, bias voltage is applied to a signal acquired by converting a phase of the modulating signal generated in the modulating signal generator 901 by 180 degrees and it is applied to the fixed electrode for detection 706*c*. Hereby, the movable part 705 is oscillated by the modulating signal of several hundred kHz.

Next, a physical quantity calculating machine 902 is formed in the semiconductor chip 802. The physical quantity calculating machine 902 is provided with a capacity-voltage conversion unit 1 (a C-V conversion unit 1), an A/D conversion unit 1, a first synchronous detection unit 1*a* and a low-pass filter LPF1. The capacity-voltage conversion unit 1 is configured by an operational amplifier that converts the variation of the capacity of the capacitative element C1 to a voltage signal. Next, the A/D conversion unit 1 is configured so that an analog signal output from the capacity-voltage conversion unit 1 is converted to a digital signal and the first synchronous detection unit 1*a* is configured so that an original low-frequency signal is restored from the signal converted to the high-frequency signal by the carrier wave. In addition, the low-pass filter LPF1 is configured so that the high-frequency signal is attenuated, a low-frequency signal is passed and an acceleration signal is calculated based upon the signal that passes the low-pass filter LPF1.

Next, the operation that detects acceleration of the acceleration sensor which is the first inertial sensor in the second embodiment will be described.

First, the modulating signal of several hundred kHz (a carrier frequency) generated in the modulating signal generator 901 is applied to the fixed electrode for detection 706*b* and a signal acquired by converting a phase of the modulating signal generated in the modulating signal generator 901 by 180 degrees is applied to the fixed electrode for detection 706*c*. Then, the movable part 705 is oscillated at the carrier frequency (several hundred kHz). As the oscillation is very fast, the variation of the capacity of the capacitative element C1 and the capacitative element C2 by the oscillation can be regarded as none. When acceleration is applied from the outside in this state, the movable part 705 is displaced. For example, as distance between the movable electrode for detection 706*a* and the fixed electrode for detection 706*b* is narrowed in the capacitative element C1 when the movable part 705 is displaced on the upside in FIG. 15, the capacity of the capacitative element C1 is increased. In the meantime, as distance between the movable electrode for detection 706*a* and the fixed electrode for detection 706*c* is widened in the capacitative element C2, the capacity of the capacitative element C2 is decreased. The variation of the capacity of the capacitative element C1 and the variation of the capacity of the capacitative element C2 become the variation of an external force response frequency (DC to several tens Hz) corresponding to acceleration applied from the outside. However, in this case, as the modulating signal is applied to the movable part 705, the variation of the external force response frequency (DC to several tens Hz) is superimposed on the carrier frequency (several hundred kHz).

Afterward, a voltage signal acquired by converting the variation of capacity to voltage in the capacity-voltage conversion unit 1 is output based upon the variation of the capacity of the capacitative element C1 and an amplitude of the modulating signal. In the voltage signal (the analog signal) output from the capacity-voltage conversion unit 1, the voltage signal of the external force response frequency (DC to several tens Hz) is superimposed on the carrier frequency (several hundred kHz).

Next, the voltage signal output from the capacity-voltage conversion unit 1 in which the voltage signal of the external force response frequency (DC to several tens Hz) is superimposed on the carrier frequency (several hundred kHz) is input to the A/D conversion unit 1 and is converted to a digital signal in the A/D conversion unit 1. The voltage signal converted to the digital signal is input to the first synchronous detection unit 1a.

In the first synchronous detection unit 1a, synchronous detection is performed using a frequency and a phase of the modulating signal. That is, in the first synchronous detection unit 1a, the voltage signal of the external force response frequency (DC to several tens Hz) is restored from the voltage signal (the digital signal) in which the voltage signal of the external force response frequency (DC to several tens Hz) is superimposed on the carrier frequency (several hundred kHz). Afterward, the restored voltage signal is input to the low-pass filter LPF1 and a high-frequency component except a required signal is attenuated. An acceleration signal 906 is calculated based upon the voltage signal (DC to several tens Hz) output from the low-pass filter LPF1 and it is output. As described above, acceleration can be detected by the acceleration sensor in the second embodiment.

Next, the configuration and the operation of the signal processing circuit of the angular velocity sensor which is the second inertial sensor in the second embodiment will be described with only a part related to this embodiment extracted.

In FIG. 15, the movable parts 725, 726 of the MEMS structure of the angular velocity sensor formed in the semiconductor chip 700 are shown.

A capacitative element C6 which functions as an actuator is formed between the movable part 725 and a driving signal generator 910. The capacitative element C6 is configured by the movable electrode for driving 728a and the fixed electrode for driving 728b. A capacitative element C7 is formed between the movable part 725 and the driving signal generator 910. The capacitative element C7 is configured by the movable electrode for driving 728a and the fixed electrode for driving 728c. Besides, a capacitative element C6' which functions as an actuator is formed between the movable part 726 and the driving signal generator 910. The capacitative element C6' is configured by the movable electrode for driving 728a and the fixed electrode for driving 728b. A capacitative element C7' is formed between the movable part 726 and the driving signal generator 910. In addition, a capacitative element C8 which functions as a capacitive detector is formed between the movable part 725 and an arithmetic unit 912. The capacitative element C8 is configured by the movable electrode for driving amplitude monitoring 729a and the fixed electrode for driving amplitude monitoring 729b. A capacitative element C9 is formed between the movable part 725 and the arithmetic unit. The capacitative element C9 is configured by the movable electrode for driving amplitude monitoring 729a and the fixed electrode for driving amplitude monitoring 729c. Further, a capacitative element C8' which functions as a capacitive detector is formed between the movable part 726 and the arithmetic unit 912. The capacitative element C8' is configured by the movable electrode for driving amplitude monitoring 729a and the fixed electrode for driving amplitude monitoring 729b. A capacitative element C9' is formed between the movable part 726 and the arithmetic unit. The capacitative element C9' is configured by the movable electrode for driving amplitude monitoring 729a and the fixed electrode for driving amplitude monitoring 729c. Furthermore, a capacitative element C10 which functions as a capacitive detector is formed between the link beam 727 that connects the movable part 725 and the movable part 726 and a physical quantity calculating machine 913. The capacitative element C10 is configured by the movable electrode for acceleration monitoring 730a and the fixed electrode for acceleration monitoring 730b. Furthermore, a capacitative element C11 is formed between the link beam 727 and the physical quantity calculating machine 913. The capacitative element C11 is configured by the movable electrode for acceleration monitoring 730a and the fixed electrode for acceleration monitoring 730c.

Next, the configuration of the signal processing circuit formed in the semiconductor chip 802 will be described.

In FIG. 15, in the semiconductor chip 802, the driving signal generator 910 that generates a driving signal is formed. The driving signal generator 910 is configured so that a driving signal of several tens kHz for example can be generated. Bias voltage is applied to a driving signal generated in the driving signal generator 910 and it is applied to the fixed electrode for driving 728c. Besides, bias voltage is applied to a signal acquired by converting a phase of the driving signal generated in the driving signal generator 910 by 180 degrees and it is applied to the fixed electrode for driving 728b. Hereby, the movable parts 725, 726 which are the driven element are oscillated out of phase by the driving signal of several tens kHz.

Next, in the semiconductor chip 802, a modulating signal generator 911 that generates a modulating signal (a carrier wave) is formed. The modulating signal generator 911 is configured so that a modulating signal of several hundred kHz for example can be generated. Bias voltage is applied to a modulating signal generated in the modulating signal generator 911 and it is applied to the movable parts 725, 726 and the link beam 727 which are respectively the driven element. Hereby, the movable parts 725, 726 and the link beam 727 are oscillated by the modulating signal of several hundred kHz.

Next, the arithmetic unit 912 is formed in the semiconductor chip 802. The arithmetic unit 912 is connected to the fixed electrodes for driving amplitude monitoring 729b, 729c and the variation of capacity corresponding to an amplitude of forced oscillation of the movable parts 725, 726 which are the driven element is detected. The arithmetic unit 912 controls so that an amplitude of the periodic oscillation of the movable parts 725, 726 is constantly kept fixed based upon the variation of capacity corresponding to an amplitude of the forced oscillation of the movable part 726 acquired from the fixed electrodes for driving amplitude monitoring 729b, 729c. Besides, the arithmetic unit 912 controls so that an angular frequency of the periodic oscillation of the movable parts 725, 726 is constantly kept fixed based upon the variation of capacity corresponding to an amplitude of the forced oscillation of the movable part 726 acquired from the fixed electrodes for driving amplitude monitoring 729b, 729c. A reference numeral 914 denotes an angular velocity signal.

In addition, the physical quantity calculating machine 913 is formed in the semiconductor chip 802. The physical quantity calculating machine 913 is connected to the fixed electrodes for acceleration monitoring 730b, 730c and the variation of capacity caused corresponding to acceleration when the acceleration is applied to the movable parts 725, 726 which are the driven element from the outside and the movable parts are displaced in the direction shown by the arrow x is detected. The physical quantity calculating machine 913 is provided with a capacity-voltage conversion unit 2 (a C-V conversion unit 2), an A/D conversion unit 2 and a synchronous detection unit 2. The capacity-voltage conversion unit 2 is configured by an operational amplifier that respectively converts the variation of the capacity of the capacitative elements C10, C11 to a voltage signal. Next, the A/D conversion unit 2 is configured so that the analog signal output from the capacity-voltage conversion unit 2 is converted to a digital signal and the synchronous detection unit 2 is configured so that an original low-frequency signal is restored from the signal converted to the high-frequency signal by the carrier wave.

Next, operation for detecting acceleration by the angular velocity sensor which is the second inertial sensor in the second embodiment will be described.

First, a modulating signal of several hundred kHz (a carrier frequency) generated in the modulating signal generator 911 is applied to the movable parts 725, 726 and the link beam 727 which are all the driven element. Then, the movable parts 725, 726 and the link beam 727 which are all the driven element are oscillated at the carrier frequency (several hundred kHz). When acceleration is applied to the semiconductor chip 700 from the outside in this state, the movable parts 725, 726 and the link beam 727 which are all the driven element are integrally displaced. At this time, as distance between the movable electrode for acceleration monitoring 730*a* and the fixed electrode for acceleration monitoring 730*b* is narrowed in the capacitative element C10 when the movable parts 725, 726 and the link beam 727 are displaced on the left side for example in FIG. 15, the capacity of the capacitative element C10 is increased. In the meantime, as distance between the movable electrode for acceleration monitoring 730*a* and the fixed electrode for acceleration monitoring 730*c* is widened in the capacitative element C11, the capacity of the capacitative element C11 is decreased. The variation of the capacity of the capacitative element C10 and the variation of the capacity of the capacitative element C11 become variation corresponding to acceleration applied from the outside and the variation is superimposed on the carrier frequency (several hundred kHz).

Afterward, a voltage signal acquired by converting the variation of capacity to voltage in the capacity-voltage conversion unit 2 based upon the variation of the capacity of the capacitative element C10 and the capacitative element C11 and an amplitude of the modulating signal is output. In the voltage signal (the analog signal) output from the capacity-voltage conversion unit 2, a voltage signal of an external force response frequency (DC to several kHz) is superimposed on the carrier frequency (several hundred kHz).

Next, the voltage signal output from the capacity-voltage conversion unit 2 in which the voltage signal of the external force response frequency (DC to several kHz) is superimposed on the carrier frequency (several hundred kHz) is input to the A/D conversion unit 2 and is converted to a digital signal in the A/D conversion unit 2. The voltage signal converted to the digital signal is input to the synchronous detection unit 2.

In the synchronous detection unit 2, synchronous detection is performed using a frequency and a phase of the modulating signal. That is, in the synchronous detection unit 2, the voltage signal of the external force response frequency (Dc to several kHz) is restored from the voltage signal (the digital signal) in which the voltage signal of the external force response frequency (DC to several kHz) is superimposed on the carrier frequency (several hundred kHz). Afterward, an acceleration signal 915 is calculated based upon the restored voltage signal and is output to a comparison judgment unit of the acceleration sensor which is the first inertial sensor.

The acceleration sensor which is the first inertial sensor is used for a key device in an attitude control system that inhibits a side skid and spin of a vehicle for example and supports safe running. The attitude control system inhibits a side skid and spin of the vehicle by controlling the output of an engine and braking force based upon the output of the acceleration sensor. Therefore, failure of the acceleration sensor may cause an accident with high probability and it is required to promptly inform in the failure of the acceleration sensor.

Then, it is desirable from a viewpoint of promptly detecting failure that it can be diagnosed whether the failure occurs or not, operating the acceleration sensor. Accordingly, some acceleration sensors are provided with a function for diagnosing whether failure occurs or not with them operated. The acceleration sensor in the second embodiment can diagnose whether failure occurs or not with it operated and the configuration of the acceleration sensor which is the first inertial sensor and which is provided with a constant diagnostic function for judging whether the failure of the acceleration sensor occurs or not, detecting acceleration will be described below.

In FIG. 15, the movable part 705 having the MEMS structure of the acceleration sensor which is formed in the semiconductor chip 700 and which is the first inertial sensor is shown, and a capacitative element C3 and a capacitative element C4 which are both a forced oscillation generating part are formed between the movable part 705 and a diagnostic signal generator 903. The capacitative element C3 is configured by the movable electrode for diagnosis 708*a* and the fixed electrode for diagnosis 708*b*. The capacitative element C4 is configured by the movable electrode for diagnosis 708*a* and the fixed electrode for diagnosis 708*c*. The diagnostic signal generator itself is well-known.

Next, in the semiconductor chip 802, the diagnostic signal generator 903 that generates a diagnostic signal and an abnormality determination device 904 are formed. The diagnostic signal generator 903 is configured so that a diagnostic signal of several hundred Hz for example can be generated. The diagnostic signal is a rectangular wave, a sinewave and a chopping wave for example. Bias voltage is applied to a diagnostic signal generated in the diagnostic signal generator 903 and it is applied to the capacitative element C3 and the capacitative element C4. Besides, the abnormality determination device 904 is connected to the movable part 705 via the physical quantity calculating machine 902 formed in the semiconductor chip 802.

In the acceleration sensor configured as described above, a diagnostic signal generated in the diagnostic signal generator 903 is respectively applied to the fixed electrode for diagnosis 708*b* and the fixed electrode for diagnosis 708*c* as two signals mutually out of phase. Hereby, electrostatic force acts between the movable electrode for diagnosis 708*a* and the fixed electrode for diagnosis 708*b* and between the movable electrode for diagnosis 708*a* and the fixed electrode for diagnosis 708*c*, and the movable part 705 can be forcedly oscillated. When the movable part 705 is forcedly oscillated, the movable part 705 is displaced and the variation of capacity occurs in the capacitative element C1 and the capacitative element C2 which both function as a capacitive detector. The variation of capacity caused in the capacitative element C1 and the capacitative element C2 is converted to a voltage signal in the capacity-voltage conversion unit 1 and the voltage signal converted in the capacity-voltage conversion unit is restored to the original diagnostic signal through the A/D conversion unit 1 and the first synchronous detection unit 1*a*.

The restored diagnostic signal is input to the abnormality determination device 904, is processed there, and it is judged there whether an abnormality occurs or not. As described above, the acceleration sensor which is the first inertial sensor in the second embodiment judges whether an abnormality occurs in the acceleration sensor or not.

Further, when a diagnostic signal of several hundred Hz is applied to the movable part 705 and acceleration (DC to several tens Hz) is applied from the outside, forcedly oscillating the movable part, the variation of capacity by forced oscillation (several hundred Hz) and the variation of capacity by acceleration (DC to several tens Hz) occur in the capacitative element C1 and the capacitative element C2 which respectively function as a capacitive detector. The variation of capacity of several hundred Hz and the variation of capacity of DC to several tens Hz are superimposed on the modulating signal (several hundred kHz). Afterward, the above-mentioned variation of capacity is converted to a voltage signal in the capacity-voltage conversion unit 1. In the voltage signal, a voltage signal of several hundred Hz and a voltage signal of DC to several tens Hz are superimposed on the modulating signal (several hundred kHz). Afterward, the voltage signal is restored to a diagnostic signal of several hundred Hz and the voltage signal of DC to several tens Hz via the A/D conversion unit 1 and the first synchronous detection unit 1a. In the physical quantity calculating machine 902, the diagnostic signal of several hundred Hz is attenuated by the low-pass filter LPF1, the voltage signal of DC to several tens Hz is extracted, and an acceleration signal is calculated based upon the voltage signal. In the meantime, the abnormality determination device 904 executes processing based upon the diagnostic signal of several hundred Hz and judges abnormality. As described above, the acceleration sensor in the second embodiment can judge whether an abnormality occurs in the acceleration sensor or not, detecting acceleration.

A characteristic of the acceleration sensor in the second embodiment is that the output signal (the acceleration signal) 915 from the angular velocity sensor which is the second inertial sensor is input to the abnormality determination device 904 for determining the abnormality of the acceleration sensor which is the first inertial sensor.

The detailed description is described in the first embodiment, however, as it can be detected whether noisy vibration is made in environment in which the sensor is installed or not, detecting an acceleration signal in the acceleration sensor which is the first inertial sensor when the output signal (the acceleration signal) 915 from the angular velocity sensor which is the second inertial sensor is input to the abnormality determination device 904 via a signal conductor inside the semiconductor chip 802 like the acceleration sensor which is the first inertial sensor in the second embodiment, it can be constantly detected whether there is possibility that the abnormality determination device 904 makes the wrong diagnosis of the sensor or not. If only a determination method in the abnormality determination device 904 is changed even if diagnosis is made, detecting acceleration in environment including vibrational noise when there is the possibility that the abnormality determination device 904 makes the wrong diagnosis of the sensor because of noisy vibration in the environment in which the sensor is installed, the reliable acceleration sensor in which wrong diagnosis is inhibited can be provided.

Especially, as the angular velocity sensor which is the second inertial sensor has a wider response band than the acceleration sensor which is the first inertial sensor in the second embodiment, vibrational noise in a wider frequency band can be detected when noisy vibration in the environment in which the sensor is installed is detected by the angular velocity sensor which is the second inertial sensor. Therefore, even if diagnosis is made in noisy environment, detecting acceleration, wrong diagnosis is inhibited and further, the reliable acceleration sensor can be provided.

Next, the detailed configuration of the abnormality determination device 904 shown in FIG. 15 will be described.

As shown in FIG. 15, the abnormality determination device 904 is provided with a band-pass filter BPF1a, a second synchronous detection unit 1b, a band-pass filter BPF1b and a comparison judgment unit. The band-pass filter BPF1a is configured so that a signal except the voltage signal of several hundred Hz output from the first synchronous detection unit 1a is regarded as noise and is removed. The second synchronous detection unit 1b is configured so that the diagnostic signal of several hundred Hz is extracted from the signal output from the first synchronous detection unit 1a of the physical quantity calculating machine 902 and including the diagnostic signal of several hundred Hz and the voltage signal of DC to several tens Hz. Concretely, when the diagnostic signal of several hundred Hz is cos wt, the signal including the diagnostic signal of several hundred Hz (cos wt) and the voltage signal of DC to several tens Hz is multiplied by cos wt in the second synchronous detection unit 1b. Then, the diagnostic signal of several hundred Hz is expressed as "cos wt×cos wt=½ (cos 2 wt+)cos 0)". That is, the diagnostic signal of several hundred Hz is converted to a signal (a signal of a second detection frequency) having a double frequency (cos 2 wt) of the diagnostic signal and a dc signal (cos 0) (a signal of a first detection frequency). In the meantime, the voltage signal of DC to several tens Hz is multiplied by cos wt to be a signal in a band of several hundred Hz. As described above, the second synchronous detection unit 1b is configured so that the diagnostic signal of several hundred Hz is detected and is converted to a signal having a double frequency and a dc signal.

Next, the band-pass filter BPF1b is configured so that the dc signal (cos 0) and the signal (cos wt) are attenuated and the signal of cos 2 wt (the signal having the double frequency of the diagnostic signal) is passed. The signal of cos 2 wt (the signal having the double frequency of the diagnostic signal) acquired by converting the diagnostic signal of several hundred Hz can be extracted by the band-pass filter BPF1b. The comparison judgment unit is configured so that an amplitude of the signal of cos 2 wt (the signal having the double frequency of the diagnostic signal) that passes the band-pass filter BPF1b and an amplitude reference value are compared. It is output as a determination signal based upon a result of comparison by the comparison judgment unit whether the acceleration sensor is abnormal or not.

The acceleration sensor provided with the diagnostic function in the second embodiment is configured as described above and operation for diagnosing whether the acceleration sensor is abnormal or not, detecting acceleration will be described below.

In FIG. 15, a diagnostic signal generated in the diagnostic signal generator 903 is respectively applied to the fixed electrode for diagnosis 708b and the fixed electrode for diagnosis 708c as two signals mutually out of phase. Hereby, electrostatic force acts between the movable electrode for diagnosis 708a and the fixed electrode for diagnosis 708b and between the movable electrode for diagnosis 708a and the fixed electrode for diagnosis 708c, and the movable part 705 can be forcedly oscillated. When the movable part 705 is forcedly oscillated, the movable part 705 is displaced. When the movable part 705 is displaced, the variation of capacity occurs in the capacitative element C1 and the capacitative element C2 which both function as a capacitive detector.

When acceleration (DC to several tens Hz) is applied from the outside in this state, the variation of capacity (several hundred Hz) by forced oscillation and the variation of capacity (DC to several tens Hz) by acceleration occur in the capacitative element C1 and the capacitative element C2 which both function as a capacitive detector. The variation of capacity of several hundred Hz and the variation of capacity of DC to several tens Hz are superimposed on the modulating signal (several hundred kHz). Afterward, the above-mentioned variation of capacity is converted to a voltage signal in the capacity-voltage conversion unit 1. In the voltage signal, a voltage signal of several hundred Hz and a voltage signal of DC to several tens Hz are superimposed on the modulating signal (several hundred kHz). Afterward, the voltage signal is restored to the diagnostic signal of several hundred Hz and the voltage signal of DC to several tens Hz via the A/D conversion unit 1 and the first synchronous detection unit 1*a*. In the physical quantity calculating machine 902, the diagnostic signal of several hundred Hz is attenuated by the low-pass filter LFP1, the voltage signal of DC to several tens Hz is extracted, and an acceleration signal is calculated based upon the voltage signal.

In the meantime, after the signal output from the first synchronous detection unit 1*a* and including the diagnostic signal of several hundred Hz and the voltage signal of DC to several tens Hz except the voltage signal of several hundred Hz is removed by the band-pass filter BPF1*a*, the voltage signal of several hundred Hz is input to the second synchronous detection unit 1*b*. In the second synchronous detection unit 1*b*, the diagnostic signal of several hundred Hz is converted to a signal having a double frequency (cos 2 wt) of the diagnostic signal and a dc signal (cos 0). In the meantime, the voltage signal of DC to several tens Hz is multiplied by cos wt to be a signal in a band of several hundred Hz.

Next, a signal output from the second synchronous detection unit 1*b* is input to the band-pass filter BPF1*b*, the dc signal (cos 0) and the signal in the band of several hundred Hz acquired by multiplying the voltage signal of DC to several tens Hz by cos wt are attenuated, and the signal having the double frequency (cos 2 wt) of the diagnostic signal corresponding to the diagnostic signal is passed.

Afterward, the comparison judgment unit compares an amplitude of the signal having the double frequency (cos 2 wt) of the diagnostic signal that passes the band-pass filter BPF1*b* and an amplitude reference value and judges whether the acceleration sensor is abnormal or not. As described above, according to the acceleration sensor in the second embodiment, it can be judged whether the acceleration sensor is abnormal or not, detecting acceleration. Accordingly, according to the acceleration sensor in the second embodiment, failure can be promptly detected.

Concretely, the comparison judgment unit can judge whether an abnormality occurs or not as follows.

In the comparison judgment unit, a predetermined amplitude reference value for example is set and the comparison judgment unit compares an amplitude of a signal having a double frequency (cos 2 wt) of a diagnostic signal 905 that passes the band-pass filter BPF1*b* with the predetermined amplitude reference value. For example, when the amplitude of the signal having the double frequency (cos 2 wt) of the diagnostic signal that passes the band-pass filter BPF1*b* is substantially 0 (zero) though the diagnostic signal generated in the diagnostic signal generator 903 is applied to the movable part 705, the movable part 705 is regarded as fastened and it can be judged that failure occurs. In the meantime, as the amplitude of the signal having the double frequency (cos 2 wt) of the diagnostic signal that passes the band-pass filter BPF1*b* is larger than the amplitude reference value when the natural frequency of the movable part 705 decreases because of the damage of the beam 704 and others and the movable part 705 is excessively displaced, compared with applied acceleration (in a case that a scale of sensitivity is abnormal), it can be judged that an abnormality occurs.

Besides, in the acceleration sensor which is the first inertial sensor in the second embodiment, as shown in FIG. 15, the diagnostic signal generated in the diagnostic signal generator 903 can be turned on/off by a switch SW1. Hereby, the following effects are acquired. For example, a case that environment in which the acceleration sensor in the second embodiment is installed has disturbance by vibration in the same frequency band as the diagnostic signal generated in the diagnostic signal generator 903 is supposed. In this case, when no switch SW1 is provided, it cannot be judged whether the forced oscillation of the movable part 705 depends upon the diagnostic signal or depends upon disturbance by vibration and wrong diagnosis may be made. In the meantime, in the acceleration sensor in the second embodiment, the switch SW1 is provided. Therefore, an effect of disturbance by vibration in a background can be excluded by executing statistical data processing by periodically turning on/off the switch SW1, performing equalization by a method of sample holding and others and judging failure using a differential value between output when the switch SW1 is turned on (the amplitude of the signal having the double frequency (cos 2 wt) of the diagnostic signal that passes the band-pass filter BPF1*b* and output when the switch SW1 is turned off (the amplitude of the signal having the double frequency (cos 2 wt) of the diagnostic signal that passes the band-pass filter BPF1*b*). That is, when the movable part 705 is oscillated by disturbance by vibration in the same frequency band as the diagnostic signal generated in the diagnostic signal generator 903, a predetermined output signal is output from the band-pass filter BPF1*b* independent of the turn on/off of the switch SW1. In the meantime, when the switch SW1 is turned on in a case that a diagnostic signal generated in the diagnostic signal generator 903 is applied to the movable part 705, the predetermined output signal is output from the band-pass filter BPF1*b*, however, when the switch SW1 is turned off, output from the band-pass filter BPF1*b* is turned zero. Accordingly, for example, when a differential value between output when the switch SW1 is turned on and output when the switch SW1 is turned off is calculated, it can be differentiated whether the forced oscillation of the movable part 705 depends upon a diagnostic signal or depends upon disturbance by vibration. Hereby, even if disturbance by vibration in the same frequency band as the diagnostic signal exists, the possibility of wrong diagnosis can be inhibited.

Further, in the acceleration sensor which is the first inertial sensor in the second embodiment, as shown in FIG. 15, the output signal (the acceleration signal) 915 from the angular velocity sensor which is the second inertial sensor is input to the abnormality determination device 904 for determining the abnormality of the acceleration sensor which is the first inertial sensor via a signal conductor inside the semiconductor chip 802. Thereby, as it can be detected whether noisy vibration is caused in environment in which the sensor is installed, detecting an acceleration signal in the acceleration sensor which is the first inertial sensor or not, it can be constantly detected in the abnormality determination device 904 whether there is the possibility of the wrong diagnosis of the sensor caused when disturbance by vibration in the same frequency band as the diagnostic signal exists only during time equal to or shorter than one cycle of diagnosis or not. When there is the possibility that the abnormality determination device 904 makes the wrong diagnosis of the sensor because of noisy vibration in the environment in which the sensor is installed, the reliable acceleration sensor where wrong diagnosis is inhibited can be provided by changing a method of determination in the abnormality determination device 904 even if diagnosis is made, detecting acceleration in the environment including vibrational noise.

Figure 16:
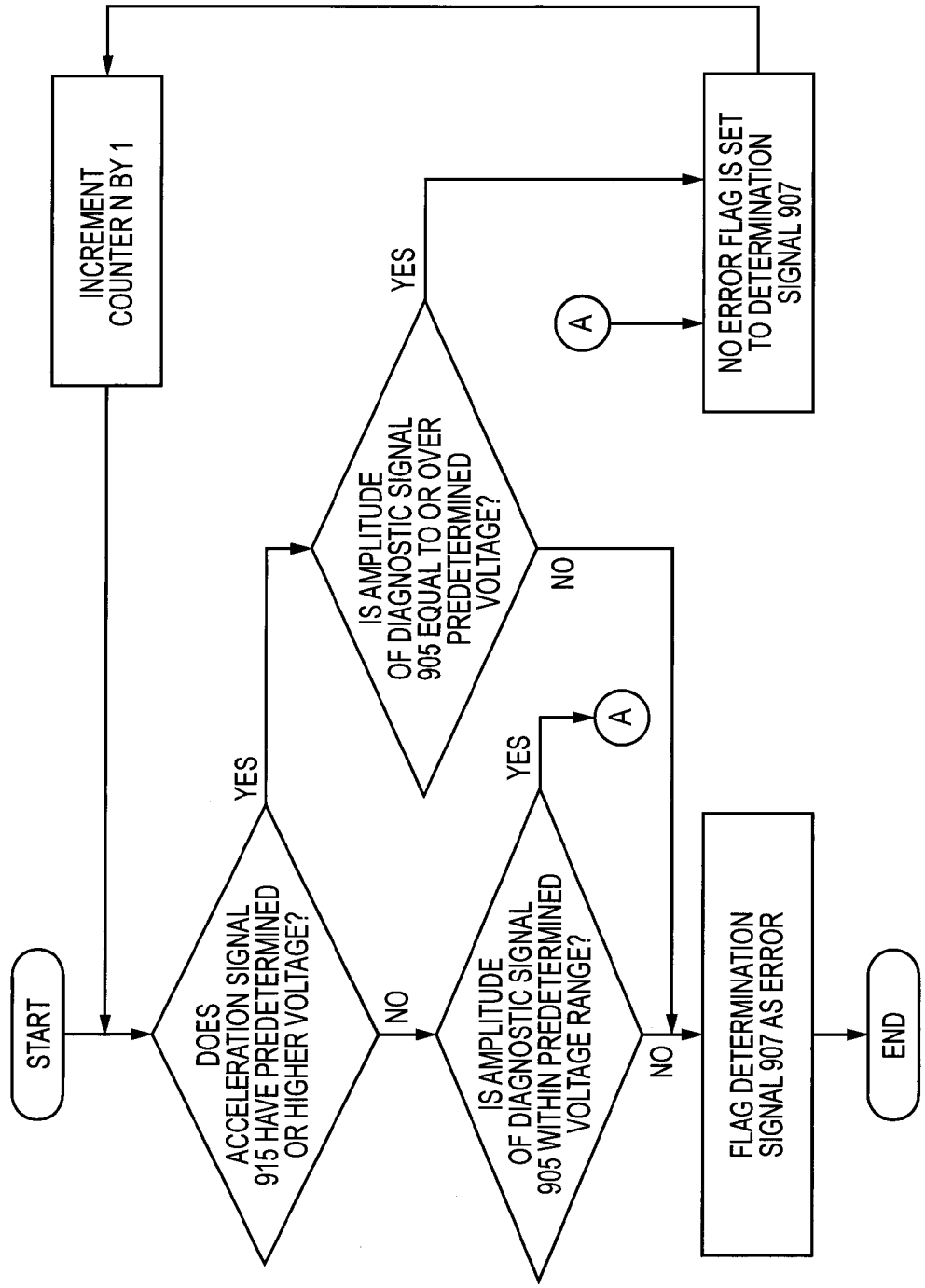
FIG. 16 is a flowchart showing a method of diagnosing the acceleration sensor which is the inertial sensor equivalent to the second embodiment of the present invention.
Figure 17:
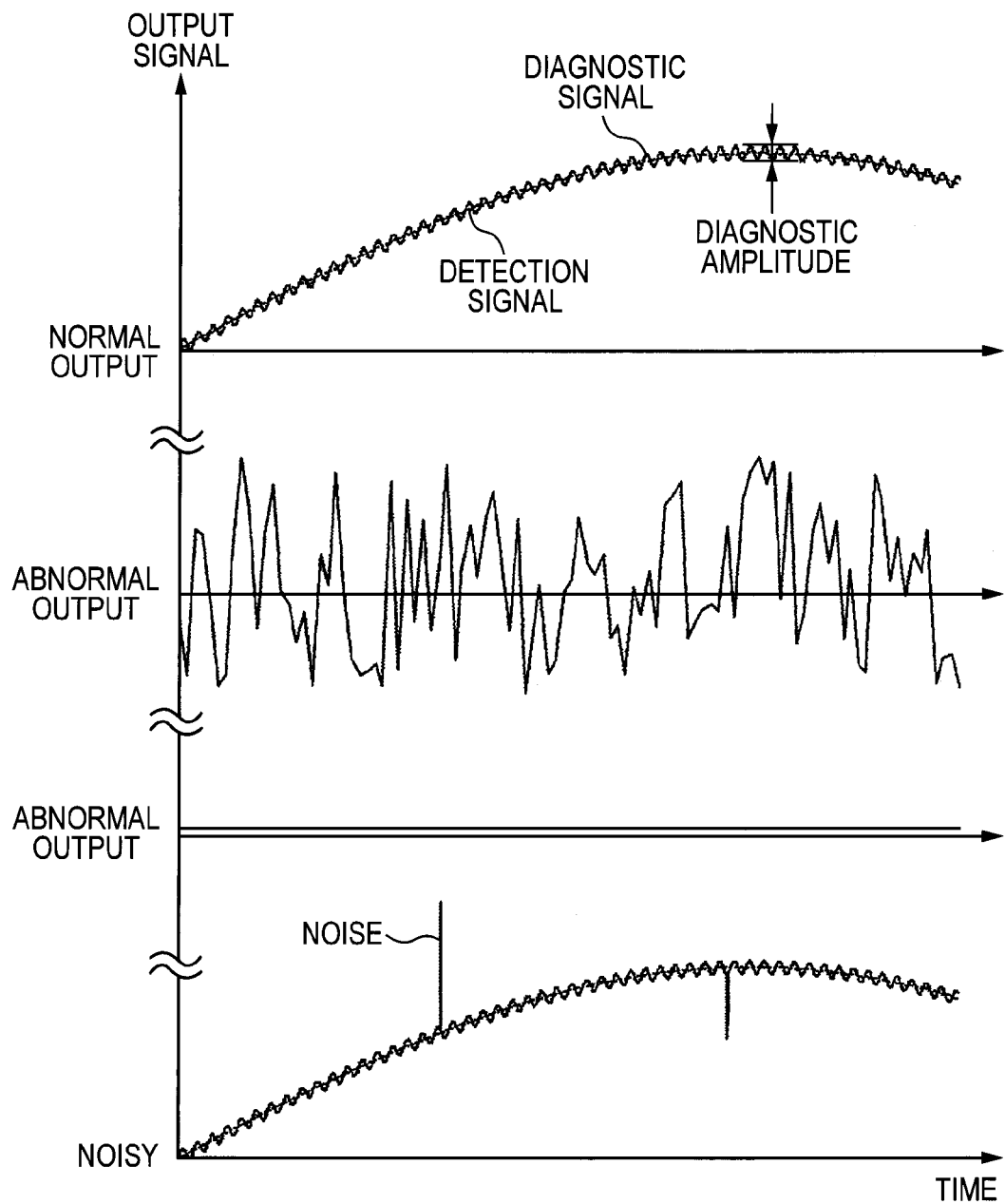
FIG. 17 shows an example of a failure diagnostic signal, an upper graphic form shows a normal case, a middle graphic form shows an abnormal case, and a lower graphic form shows a case including sudden noise.

Concretely, a method of determination by the comparison judgment unit is defined as shown in FIG. 16. As a case that the output signal (the acceleration signal) 915 from the angular velocity sensor which is the second inertial sensor is equal to or over a predetermined voltage value means that noisy vibration is caused in environment in which the sensor is installed, that is, means that the comparison judgment unit may make wrong diagnosis with high probability, the following fastening judgment processing is executed differently from normal comparison judgment processing. In the fastening judgment processing, when an amplitude of the signal having the double frequency (cos 2 wt) of the diagnostic signal 905 that passes the band-pass filter BPF1 is below a predetermined amplitude reference value, it is determined that the displacement of the movable part 705 is little though noisy vibration is caused in environment in which the sensor is installed and failure by fastening occurs, and an abnormality determination signal is output as a determination signal 907. In the meantime, when the amplitude of the signal having the double frequency (cos 2 wt) of the diagnostic signal 905 that passes the band-pass filter BPF1*b* is equal to or over the predetermined amplitude reference value, control is returned to a process for re-comparison judgment without outputting an abnormality determination signal as the determination signal 907. As no noisy vibration exists in environment in which the sensor is installed when the output signal (the acceleration signal) 915 from the angular velocity sensor which is the second inertial sensor is equal to or below the predetermined voltage value, normal comparison judgment processing is applied to the amplitude of the signal having the double frequency (cos 2 wt) of the diagnostic signal 905 that passes the band-pass filter BPF1*b* and it is determined whether the sensor is abnormal or not.

In the acceleration sensor in the second embodiment, as the angular velocity sensor which is the second inertial sensor has a wider response band than the acceleration sensor which is the first inertial sensor, vibrational noise in a wider frequency band can be detected when noisy vibration is detected in environment in which the sensor is installed by the angular velocity sensor which is the second inertial sensor. Therefore, even if diagnosis is made, detecting acceleration in noisy environment, wrong diagnosis is inhibited and the further reliable acceleration sensor can be provided.

Besides, in the acceleration sensor in the second embodiment, as the acceleration sensor which is the first inertial sensor and the angular velocity sensor which is the second inertial sensor are formed on the same SOI substrate, precision in detecting noisy vibration in environment in which the acceleration sensor which is the first inertial sensor is installed by the angular velocity sensor which is the second inertial sensor is higher. Therefore, even if diagnosis is made by the acceleration sensor which is the first inertial sensor in the noisy environment, detecting acceleration, wrong diagnosis is inhibited and the further reliable sensor can be provided.

Further, in the acceleration sensor in the second embodiment, the acceleration sensor which is the first inertial sensor and the angular velocity sensor which is the second inertial sensor utilize the same semiconductor chip in which a signal processing circuit for calculating the respective physical quantity of the acceleration sensor which is the first inertial sensor and the angular velocity sensor which is the second inertial sensor is formed. Therefore, information of noisy vibration in environment in which the sensor is installed referred when the acceleration sensor which is the first inertial sensor judges whether the acceleration sensor is abnormal or not, detecting acceleration is input to the comparison judgment unit for diagnosing the acceleration sensor which is the first inertial sensor via the inside of the semiconductor chip in which the signal processing circuit is formed without passing a control circuit located outside the sensor unit. That is, the reliable acceleration sensor where diagnosis is made, detecting acceleration without applying a load onto the control circuit outside the sensor unit and wrong diagnosis is inhibited can be provided.

Furthermore, in the acceleration sensor in the second embodiment, a self-diagnosis function by the acceleration sensor having a detection axis in the direction shown by the arrow x of the chip shown in FIG. 10 as the first inertial sensor is described, however, even if an acceleration sensor having a detection axis in a direction shown by an arrow y of the chip shown in FIG. 10 as the first inertial sensor is installed, a self-diagnosis function can be realized.

As described above, according to this embodiment, the inertial sensor that can inhibit wrong diagnosis can be provided by providing the second sensor. Besides, a wider frequency band and vibrational noise in a larger range of acceleration can be detected by widening a range of the sensitivity of the second sensor. Further, as the two sensors are formed in the same semiconductor chip, a load onto the external control circuit can be eliminated.

The present invention has been described in detail; however, the main embodiments of the present invention will be listed below.

(1) The inertial sensor according to the present invention is provided with a first substrate, a first cavity formed on the first substrate, a first fixed part formed in the first cavity, a first elastically deformed part formed in the first cavity and connected to the fixed part, a first movable part formed in the first cavity and connected to the elastically deformed part, a first capacity sensing element that includes a first capacitative element which mutually opposes a first fixed electrode formed in the first cavity and a first movable electrode formed in the movable part and outputs the variation of the capacity of the first capacitative element caused when the movable part is displaced by external force, a first physical quantity calculation terminal connected to a first physical quantity calculating machine that calculates the physical quantity of the external force based upon the variation of the capacity output from the first capacity sensing element, a forced oscillation generator that includes a second capacitative element which mutually opposes a second fixed electrode formed in the first cavity and a second movable electrode formed in the movable part, that includes a terminal for applying a diagnostic signal for applying a diagnostic signal between the second fixed electrode and the second movable electrode and that generates electrostatic force between the second fixed electrode and the second movable electrode by applying a diagnostic signal to the terminal for applying a diagnostic signal and forcedly oscillates them, an abnormality determination device which is indirectly connected to the first physical quantity calculation terminal and judges whether the first capacity sensing element is abnormal or not based upon forced oscillation generated in the forced oscillation generator, a second substrate installed in the same vehicle as the first substrate, a second cavity formed on the second substrate, a second fixed part formed in the second cavity, a second elastically deformed part formed in the second cavity and connected to the second fixed part, a second movable part formed in the second cavity and connected to the second elastically deformed part, a second capacity sensing element that includes a third capacitative element which mutually opposes a third fixed electrode formed in the second cavity and a third movable electrode formed in the second movable part and that outputs the variation of the capacity of the third capacitative element caused when the second movable part is displaced by external force and a second physical quantity calculation terminal connected to a second physical quantity calculating machine that calculates the physical quantity of the external force based upon the variation of the capacity output from the second capacity sensing element, and has a characteristic that in the abnormality determination device, a result of determining abnormality is changed depending upon a value acquired from the second physical quantity calculation terminal.

(2) The inertial sensor according to the present invention is provided with a first movable part, a first sensing element which has a fixed electrode and which detects the displacement of the first movable part using capacity between the movable part and the fixed electrode, forced oscillation means that forcedly oscillates the first movable part by applying a diagnostic signal, a first physical quantity calculating machine that calculates physical quantity based upon a detection signal from the first sensing element and an abnormality determination device that determines whether the physical quantity is abnormal or not using the diagnostic signal acquired via the first sensing element, and has a characteristic that a second sensor mounted in the same vehicle as the above-mentioned vehicle and connected to the abnormality determination device is further provided.

LIST OF REFERENCE SIGNS

100—Semiconductor chip, 101—Frame, 102—Cavity, 103—Fixed part, 104—Beam, 105—Movable part, 106a—Movable electrode for detection, 106b—Fixed electrode for detection, 106c—Fixed electrode for detection, 106d—Pad, 106e—Pad, 107—Pad, 108a—Movable electrode for diagnosis, 108b—Fixed electrode for diagnosis, 108c—Fixed electrode for diagnosis, 108d—Pad, 108e—Pad, 110—Substrate, 111—Insulating oxide film, 112—Silicon active layer, 200—Semiconductor chip, 201—Frame, 202—Cavity, 203—Fixed part, 204—Beam, 205—Movable part, 206a—Movable electrode for detection, 206b—Fixed electrode for detection, 206c—Fixed electrode for detection, 206d—Pad, 206e—Pad, 207—Pad, 210—Substrate, 211—Insulating oxide film, 212—Silicon active layer, 300—Enclosure, 301—Adhesive, 302—Semiconductor chip (Integrated circuit), 303—Adhesive, 304a—Pad, 304b—Pad, 304 c—Terminal, 305a—Wire, 305b—Wire, 306—Terminal, 307—Lid, 400—Enclosure, 401—Adhesive, 402—Semiconductor chip (Integrated circuit), 403—Adhesive, 404a—Pad, 404b—Pad, 404c—Terminal, 405a—Wire, 405b—Wire, 406—Terminal, 407—Lid, 500—First acceleration sensor, 501—Modulating signal generator, 502—Physical quantity calculating machine, 503—Diagnostic signal generator, 504—Abnormality determination device, 510—Second acceleration sensor, 511—Modulating signal generator, 512—Physical quantity calculating machine, 520—Acceleration signal 1, 521—Determination signal, 522—Acceleration signal 2, 523—Diagnostic signal, 700—Semiconductor chip, 701—Frame, 702—Cavity, 703—Fixed part, 704—Beam, 705—Movable part, 706a—Movable electrode for detection, 706b—Fixed electrode for detection, 706c—Fixed electrode for detection, 706d—Through electrode, 706e—Through electrode, 707—Through electrode, 708a—Movable electrode for diagnosis, 708b—Fixed electrode for diagnosis, 708c—Fixed electrode for diagnosis, 708d—Through electrode, 708e—Through electrode, 710—Substrate, 711—Insulating oxide film, 712—Silicon active layer, 713—Through electrode materials, 714—Insulating materials, 715—Pad, 716—Pad, 722—Cavity, 723—Fixed part, 724—Beam, 725—Movable part, 726—Movable part, 727—Link beam, 728a—Movable electrode for driving, 728b—Fixed electrode for driving, 728c—Fixed electrode for driving, 728d—Through electrode, 728e—Through electrode, 729a—Movable electrode for driving amplitude monitoring, 729b—Fixed electrode for driving amplitude monitoring, 729c—Fixed electrode for driving amplitude monitoring, 729d—Through electrode, 729e—Through electrode, 730a—Movable electrode for acceleration monitoring, 730b—Fixed electrode for acceleration monitoring, 730c—Fixed electrode for acceleration monitoring, 730d—Through electrode, 730e—Through electrode, 731—Through electrode, 800—Enclosure, 801—Adhesive, 802—Semiconductor chip (Integrated circuit), 803—Adhesive, 804—Pad, 805a—Wire, 805b—Wire, 806—Terminal, 807—Terminal, 808—Lid, 809—Cap, 810—MEMS chip, 901—Modulating signal generator, 902—Physical quantity calculating machine, 903—Diagnostic signal generator, 904—Abnormality determination device, 905—Diagnostic signal, 906—Acceleration signal, 907—Determination signal, 910—Driving signal generator, 911—Modulating signal generator, 912—Arithmetic unit, 913—Physical quantity calculating machine, 914—Angular velocity signal, 915—Acceleration signal.

The invention claimed is:

1. An inertial sensor, comprising:
a first substrate to be installed in a vehicle;
a first cavity formed on the first substrate;
a first fixed part formed in the first cavity;
a first elastically deformed part formed in the cavity and connected to the fixed part;
a first movable part formed in the first cavity and connected to the elastically deformed part;
a first capacity sensing element which includes a first capacitative element that mutually opposes a first fixed electrode formed in the first cavity and a first movable electrode formed in the movable part and which outputs variation of capacity of the first capacitative element caused when the movable part is displaced by an external force;
a first physical quantity calculation terminal connected to a first physical quantity calculating device that calculates a physical quantity of the external force based upon the variation of the capacity output from the first capacity sensing element;
a forced oscillation generating device which includes a second capacitative element that mutually opposes a second fixed electrode formed in the first cavity and a second movable electrode formed in the movable part, which includes a terminal for applying a diagnostic signal between the second fixed electrode and the second movable electrode and which generates electrostatic force between the second fixed electrode and the second movable electrode by applying a diagnostic signal to the terminal for applying the diagnostic signal and forcedly oscillates them;
an abnormality determination device which is indirectly connected to the first physical quantity calculation terminal and which judges whether the inertial sensor is abnormal or not based upon forced oscillation generated in the forced oscillation generating device;

a second substrate to be installed in the vehicle;

a second cavity formed on the second substrate;

a second fixed part formed in the second cavity;

a second elastically deformed part formed in the second cavity and connected to the second fixed part;

a second movable part formed in the second cavity and connected to the second elastically deformed part;

a second capacity sensing element which includes a third capacitative element that mutually opposes a third fixed electrode formed in the second cavity and a third movable electrode formed in the second movable part and which outputs variation of capacity of the third capacitative element caused when the second movable part is displaced by an external force; and a second physical quantity calculation terminal connected to a second physical quantity calculating device that calculates physical quantity of the external force based upon the variation of the capacity output from the second capacity sensing element, wherein:

in the abnormality determination device, a result of determining abnormality is determined depending upon a value acquired from the second physical quantity calculation terminal.

2. The inertial sensor according to claim 1, wherein:
a range of physical quantity output from the second physical quantity calculation terminal is larger than a range of physical quantity output from the first physical quantity calculation terminal.

3. The inertial sensor according to claim 1, wherein:
a frequency response band of physical quantity output from the second physical quantity calculation terminal is larger than a frequency response band of physical quantity output from the first physical quantity calculation terminal.

4. The inertial sensor according to claim 1, wherein:
a first physical quantity calculating mechanism including the first capacity sensing element is an acceleration sensor; and
a second physical quantity calculating mechanism including the second capacity sensing element is an acceleration sensor.

5. The inertial sensor according to claim 1, wherein:
a first physical quantity calculating mechanism including the first capacity sensing element is an acceleration sensor; and
a second physical quantity calculating mechanism including the second capacity sensing element is an angular velocity sensor.

6. The inertial sensor according to claim 1, wherein:
a first physical quantity calculating mechanism including the first capacity sensing element and a second physical quantity calculating mechanism including the second capacity sensing element are formed on the same substrate.

7. The inertial sensor according to claim 1, wherein:
the abnormality determination device compares the value acquired from the second physical quantity calculation terminal and a predetermined voltage.

8. The inertial sensor according to claim 7, wherein:
the abnormality determination device further compares an amplitude of the diagnostic signal and a predetermined amplitude reference value.

9. The inertial sensor according to claim 8, wherein:
the abnormality determination device compares an amplitude of the diagnostic signal and the predetermined amplitude reference value when a value acquired from the second physical quantity calculation terminal is below the predetermined voltage.

10. The inertial sensor according to claim 1, wherein:
pressure of the first cavity is different from that of the second cavity.

11. An inertial sensor which is to be used in a vehicle, comprising:
a first movable part;
a first sensing element that has a fixed electrode and that detects the displacement of the first movable part using capacity between the movable part and the fixed electrode;
a forced oscillation generating device that forcedly oscillates the first movable part by applying a diagnostic signal;
a first physical quantity calculating device that calculates physical quantity based upon a detection signal from the first sensing element;
an abnormality determination device that determines whether the inertial sensor is abnormal or not using the diagnostic signal acquired via the first sensing element; and
a second sensor to be mounted in the vehicle and connected to the abnormality determination device.

12. The inertial sensor according to claim 11, wherein:
an output signal from the second sensor is input to the abnormality determination device.

13. The inertial sensor according to claim 12, wherein:
the physical quantity is acceleration; and
the output signal from the second sensor is also an acceleration signal.

14. The inertial sensor according to claim 11, wherein:
the forced oscillation generating device is provided with a switch that turns on/off the diagnostic signal to the movable part.

* * * * *